(12) United States Patent
Rajasekaran et al.

(10) Patent No.: US 7,111,789 B2
(45) Date of Patent: Sep. 26, 2006

(54) ENHANCEMENTS TO MULTI-PARTY AUTHENTICATION AND OTHER PROTOCOLS

(75) Inventors: Sanguthevar Rajasekaran, Los Altos, CA (US); James Reno, Scotts Valley, CA (US); Rammohan Varadarajan, Cupertino, CA (US); Sanjay Vyas, Sunnyvale, CA (US); Do-Pil Park, Redwood City, CA (US); Robert Jerdonek, Sunnyvale, CA (US)

(73) Assignee: Arcot Systems, Inc., Sunnyvale, CA (US)

( * ) Notice: Subject to any disclaimer, the term of this patent is extended or adjusted under 35 U.S.C. 154(b) by 336 days.

(21) Appl. No.: 10/225,935

(22) Filed: Aug. 22, 2002

(65) Prior Publication Data

US 2003/0042301 A1    Mar. 6, 2003

Related U.S. Application Data

(60) Provisional application No. 60/316,677, filed on Aug. 31, 2001, provisional application No. 60/340,675, filed on Oct. 30, 2001.

(51) Int. Cl.
*G06K 7/10* (2006.01)

(52) U.S. Cl. .................. 235/472.01; 235/472.02; 235/472.03

(58) Field of Classification Search ........ 235/472.01, 235/472.02, 472.03, 379
See application file for complete search history.

(56) References Cited

U.S. PATENT DOCUMENTS

| | | | |
|---|---|---|---|
| 5,221,838 A * | 6/1993 | Gutman et al. | 235/379 |
| 5,590,197 A | 12/1996 | Chen et al. | 380/24 |
| 5,936,220 A * | 8/1999 | Hoshino et al. | 235/380 |
| 6,018,724 A | 1/2000 | Arent | 705/44 |
| 2001/0034725 A1 * | 10/2001 | Park et al. | 705/79 |
| 2001/0054148 A1 * | 12/2001 | Hoornaert et al. | 713/172 |
| 2002/0046169 A1 | 4/2002 | Keresman, III et al. | 705/41 |
| 2002/0062280 A1 | 5/2002 | Zachariassen et al. | 705/39 |
| 2002/0065774 A1 * | 5/2002 | Young et al. | 705/41 |
| 2002/0077993 A1 | 6/2002 | Immonen et al. | 705/77 |
| 2002/0107755 A1 | 8/2002 | Steed et al. | 705/26 |

* cited by examiner

*Primary Examiner*—Karl D Frech
(74) *Attorney, Agent, or Firm*—Townsend and Townsend and Crew, LLP

(57) ABSTRACT

Techniques are disclosed to increase the efficiency of multi-party authentication communications protocols. One technique includes a four party authentication method utilizing a general authenticator to store and provide a credit card authentication password and other payment information to an issuing bank and/or other parties involved in the transaction. Other techniques include the use of skeleton messages to minimize the forwarding of information through a forwarding party, the elimination of redundant communications exchanges, the use of a merchant appliance hardware solution to minimize system integration difficulties, and/or the imposition of credit card constraints. The techniques may be used singly or in combination.

44 Claims, 14 Drawing Sheets

ENHANCEMENTS TO MULTI-PARTY AUTHENTICATION AND OTHER PROTOCOLS

RELATED APPLICATIONS

This application claims the benefit of U.S. Provisional Application No. 60/316,677, filed Aug. 31, 2001, and U.S. Provisional Application No. 60/340,675, filed Oct. 30, 2001.

FIELD

This application relates generally to increasing the efficiency of network communication and more specifically, to enhancing the efficiency of authentication and other protocols.

BACKGROUND

Currently, online purchase transactions on the Web suffer from lack of adequate security. Specifically, there are no cardholder authentication schemes that have been widely adopted on the Web. In a typical conventional online purchase transaction, the cardholder submits her credit card type, credit card number, expiration date, billing address, and shipping address, to the merchant. Merchants who participate in e-commerce often use an industry-standard protocol, such as Secure Sockets Layer ("SSL"), to encrypt the data exchanged between the customer's Web browser and the merchant's Web commerce server so that sensitive information such as a credit card number can be securely transmitted from the customer to the merchant. Furthermore, merchants also often register with a Certification Authority ("CA"), such as VeriSign, to enable customers to authenticate the merchant. However, the customer or cardholder is not currently authenticated in online purchase transactions. As such, the risk of customer fraud is significant—some reports have estimated that 20 to 40 percent of online purchase attempts are fraudulent and the Federal Trade Commission has reported that the combined losses to the credit card industry and to cardholders, from unauthorized use of credit cards, exceed $2 billion annually. Because customer liability for fraud is limited to $50 per card under federal law, merchants generally bear the costs of such fraud. When customer fraud does occur, credit card companies often impose a "chargeback" fee on the merchant for the fraudulent transaction. As such, the merchant often loses the initial transaction amount, the cost of the product, the shipping cost, the credit card transaction fee, as well as the chargeback amount.

In order to reduce the risk of customer fraud in online transactions, credit card companies have developed payer authentication schemes that would enable online merchants to protect themselves and minimize their losses due to online credit card fraud. For a cardholder authentication scheme to be adopted by a large user base, it should not be inconvenient, complex, or expensive. For example, in 1997, Visa and MasterCard launched a first generation cardholder authentication scheme called the Secure Electronic Transaction ("SET") authentication protocol. This protocol was never widely adopted by banks because it was too cumbersome to implement or use. As exemplified by the SET experience, difficult integration issues with legacy software systems, large downloads, and long communication exchanges have discouraged merchants, consumers, and banks from participating in an authentication scheme.

A second generation of cardholder authentication schemes now being introduced represents the current state of the art prior to this application. For example, Visa is currently rolling out its "Verified by Visa" service which incorporates an online payer authentication protocol called Three-Domain Secure ("3-D Secure") designed to authenticate a cardholder in substantially real time. With 3-D Secure, merchants install a plug-in software module which is activated when a cardholder enters her purchasing information and selects the "buy" button on the checkout page of the merchant's Web site. If the cardholder is enrolled in the "Verified by Visa" service, a pop-up window will appear on the cardholder's screen prompting her to enter a confidential authentication password. The authentication password is transmitted to the issuing bank, which is thus able to authenticate the cardholder and authorize the transaction for the merchant. Visa announced in September 2001 that online merchants who participate in "Verified by Visa" would face no liability for any transaction processed by the service. Other credit card companies have also developed their own services to minimize online credit card fraud. For example, in May 2001, MasterCard announced its Secure Payment Application ("SPA") service, which combines a server based e-wallet and an applet downloaded onto the cardholder's PC to authenticate the cardholder.

Since all of the foregoing authentication schemes involve at least three parties, we shall for convenience refer to the class to which they belong as three party authentication methods ("3PAM"). In a 3PAM scheme the following four steps may be implemented: (1) the cardholder places an order on the merchant Web site; (2) the cardholder is authenticated by the issuing bank; (3) the issuing bank transmits a validation message to the merchant; and (4) the merchant informs the cardholder of the success of the purchase. While these four steps may be implemented over the Internet (in whole or in part), via, for example and without limitation, the Hypertext Transfer Protocol ("HTTP") or HTTP combined with SSL ("HTTPS"), those skilled in the art will realize that some of these steps could also be performed on a separate proprietary network, for example and without limitation, owned by a credit card company such as Visa or MasterCard.

SUMMARY

We disclose herein various techniques for improved transactional schemes as applicable to online credit card payments and related applications.

One exemplary technique introduces a fourth party, in the form of a wallet, into the cardholder authentication scheme. At a minimum, a wallet containing the cardholder's authentication password, can provide such password, as required, to either the merchant or the cardholder, for subsequent transmission to an issuing bank (or other party which authenticates the cardholder).

In an improved implementation of the wallet—which we shall for convenience refer to as a "general authenticator" (or "GA")—the GA can be configured to participate in the authentication process by transmitting the authentication password to the issuing bank or other authenticator (either directly or through the cardholder) rather than necessarily going through the merchant and/or its acquiring bank as in the conventional implementation.[1] Because the GA is now an additional party that actively participates in the authentication process, we may refer to this as a four party authentication method (or "4PAM").

[1] Although predecessor forms of the GAs contemplated herein (such as currently existing forms of software wallets) have been used in the past for password control and certain other applications, they have not been used for authentication of the type contemplated herein.

Depending on the particular implementation, the GA may also facilitate the ability to use multiple cards, the presentation of payment information, and/or still other aspects of a purchase transaction, all while placing a relatively small burden on the cardholder in terms of manual information input. As contemplated herein, the GA may be based on so-called software wallet technology, suitably modified to perform the techniques and applications contemplated herein.

Another exemplary embodiment usable in improved transactional schemes is directed at increasing the efficiency of communications among the parties to a multi-party transactional process. During many typical transactions, authentication information is transmitted to one or more parties participating in the authentication process, often through one or more intermediate parties. In certain exemplary implementations, the information may only be required by its ultimate recipient, rather than by the intermediate(s). For example, specific implementations of a 3PAM scheme may involve transmissions of large data records, possibly including cardholder payment information and protocol information, between parties. It is possible that certain parties that receive these transmissions merely serve as forwarding agents for other parties and do not need to use portions of the data themselves. Upon a determination of what portions of data are important to which parties, this "forwarding effect" can be minimized to increase the efficiency of communication channels. Thus, in a related exemplary embodiment, we introduce the concept of a "skeleton message" to reduce congestion of communication channels. Specifically, large data records are divided up and, if possible, certain divided portions are sent (or otherwise made available) directly to the proper party rather than through a forwarding party. Other portions (i.e., the skeleton messages), perhaps by necessity, are still sent to the proper party through a forwarding party. These skeleton messages contain a small or minimal amount of data, to reduce congestion of communication channels when forwarding such data. Ultimately, the proper party can reassemble the divided portions back into the complete data record, if necessary. The use of such skeleton messages therefore increases efficiency of the authentication process.

Another exemplary technique for increasing the efficiency of 3PAM (and other) implementations involves identifying and eliminating certain dispensable communication exchanges between parties. For example and without limitation, certain "request and response" exchanges between parties can be eliminated if the success of subsequent communication between the parties, by implication, indicates an affirmative response to the request, obviating the need to transmit the request. As another example, independent, parallel or serially related requests to multiple services can be combined into a single request. As yet another example, we also disclose caching techniques to eliminate unnecessary queries, thereby further increasing the efficiency of the authentication scheme.

In deploying the foregoing improvements, one must often comply with existing 3PAM implementations, either completely or as a matter of backwards compatibility. Certain such implementations, such as Visa's 3-D Secure and MasterCard's SPA, typically require the merchants to install new software modules that should work seamlessly with their current network server applications. Because such installation can potentially cause difficult integration issues and discourage merchants from participating in an authentication protocol, we also disclose a hardware solution (for convenience, a merchant appliance or "MA"), that obviates the need for a merchant to change her current online payment transaction infrastructure. One or more of the techniques contemplated in this patent application can be implemented in connection with the merchant appliance.

Finally, certain improvements can be achieved in payment protocols via the introduction of credit card constraints. Such constraints may include, for example and without limitation, (1) self-imposed daily purchase limits by a spendthrift, (2) parental constraints on the ability to purchase certain products (such as tobacco, alcohol, pornography, etc.) with a teenager's card, (3) limitations on categories of purchases such as food, clothes, books, cosmetics, etc., (4) limitations on purchases during certain time periods, or (5) limitations on purchases with different merchants.

All the foregoing exemplary embodiments of improvements to authentication and other protocols may be used individually or in combination with each other. For example and without limitation, one or more techniques for skeleton messages, dispensable communications, merchant appliance, and credit card constraints, may be used with 3PAM.

As a matter of convenience, the foregoing and following descriptions shall be set forth in the context of the Internet and the Web. However, those skilled in art will realize that the techniques disclosed herein are usable in any public or private network environment where information is exchanged between parties. This includes, for example and without limitation, extranets, intranets, wireless networks, and other telephonic, radio, or cable communications networks, whether circuit-switched or packet-switched, and whether analog, digital, or optical. Furthermore, although we shall use HTTP or HTTPS as an exemplary application-level protocol, those skilled in the art will recognize that the techniques disclosed herein can be applied to any application-level protocol which may or may not share similar characteristics with HTTP (for example and without limitation, stateless communication). Thus, the techniques should be understood to apply to any communications protocol, whether reliable (for example and without limitation, TCP/IP) or unreliable (for example and without limitation, IP or UDP), and whether or not layered on top of another protocol, as long as certain communication exchanges in the protocol are dispensable or inefficient and can be refined. Therefore, although the foregoing and the following descriptions use authentication protocols of online purchase transactions as an example, those skilled in the art will recognize that they also can be practiced in many other types of transactions. Similarly, the exemplary techniques describe online purchase transactions with the use of credit cards but are not limited thereto. Indeed, as used herein, the term "card" (or "credit card") refers to any type of purchasing card, including without limitation, credit cards, debit cards, corporate cards, smart cards, gift cards, charge cards, bank cards, prepaid cards, and any type of card that can be used in purchase transactions. Similarly, the term "cardholder" refers to any individual or entity holding or using a card. Additionally, the term "password" refers to any identification information or code that can uniquely identify an individual or entity in order to provide access to a service. This includes, but is not limited to simple character passwords, PIN numbers, smart card chips, biometrics such as retinal or iris scans, fingerprints, face recognition, voice recognition, or any other form of access rights.

DETAILED DESCRIPTION

Pending U.S. Provisional Applications Nos. 60/316,677 (filed on Aug. 31, 2001) and No. 60/340,675 (filed on Oct. 30, 2001) are hereby incorporated by reference in their entirety (except to the extent either such application contained a statement of a claim).

In order to better understand the embodiments, implementations, techniques, and improvements described herein, it will be helpful to provide detailed descriptions of the current state of art. Therefore, we first present a detailed description of the current state of art in online purchase transactions and cardholder authentication schemes.

Online Purchase Transactions (Current State of Art)

In a conventional online purchase transaction (without regard to whether cardholder authentication is involved), four parties are normally involved: the cardholder 100, the merchant 110, the bank that issues the card to the cardholder (known as the issuing bank 120), and the bank that processes the merchant's credit card transactions (known as the acquiring bank 130). For ease of comparison among the figures, we shall endeavor to use these labels to refer to similar parties throughout the following description and accompanying figures.[2] Additionally, two separate communications networks are typically involved in the transaction: the Internet and a secure (usually, separate) proprietary network normally owned by a credit card company such as Visa or MasterCard. Descriptions of a conventional online credit card transaction are normally broken into three parts: the authorization, the request for funds, and the funds transfer. Those skilled in the art will recognize that there are variations in timing and the settlement of accounts from the following description. The diagram in FIG. 1 and the flowchart in FIG. 2 supplement the following description of a conventional online purchase transaction.

[2] The various figures depict cardholders, merchants, banks, and other entities participating in authentication and/or other multi-party protocols. Those skilled in the art will appreciate that, although reference is made to the entity, in many cases, the actual communication among the entities may be effected by a computer or other device (e.g., cell phones, pagers, PDAs, etc.) operated by or on behalf of the entity, and the various references should be so construed according to the context of the particular usage. Similarly, those skilled in the art will appreciate that the devices can be implemented in any combination of software (e.g., whether running on a general purpose computer or on a more specialized processor) and/or hardware (e.g., PALs, etc.).

Authorization

Figure 1:
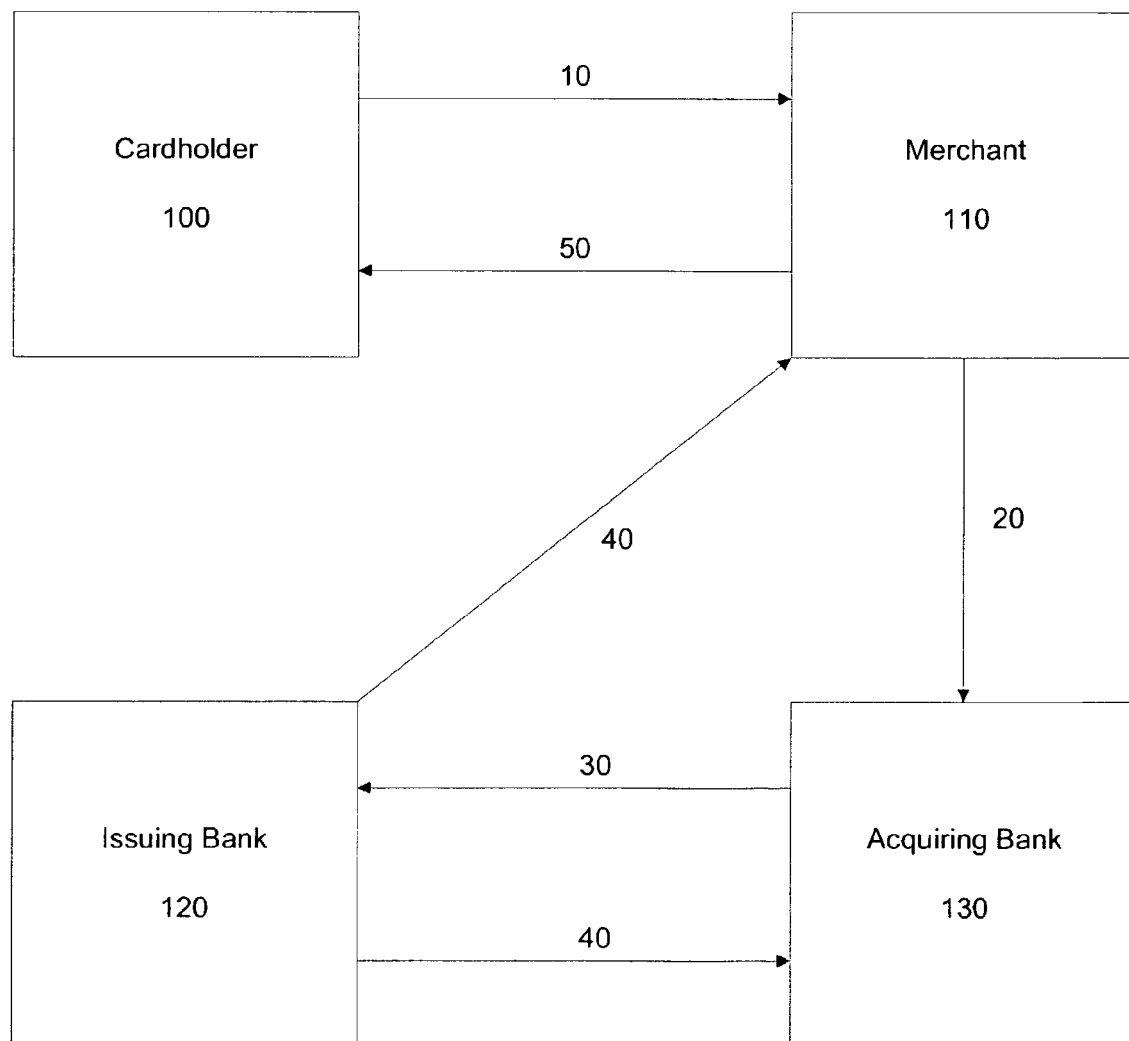
FIG. 1 illustrates the authorization phase of a conventional online purchase transaction (i.e. without cardholder authentication).
Figure 2:
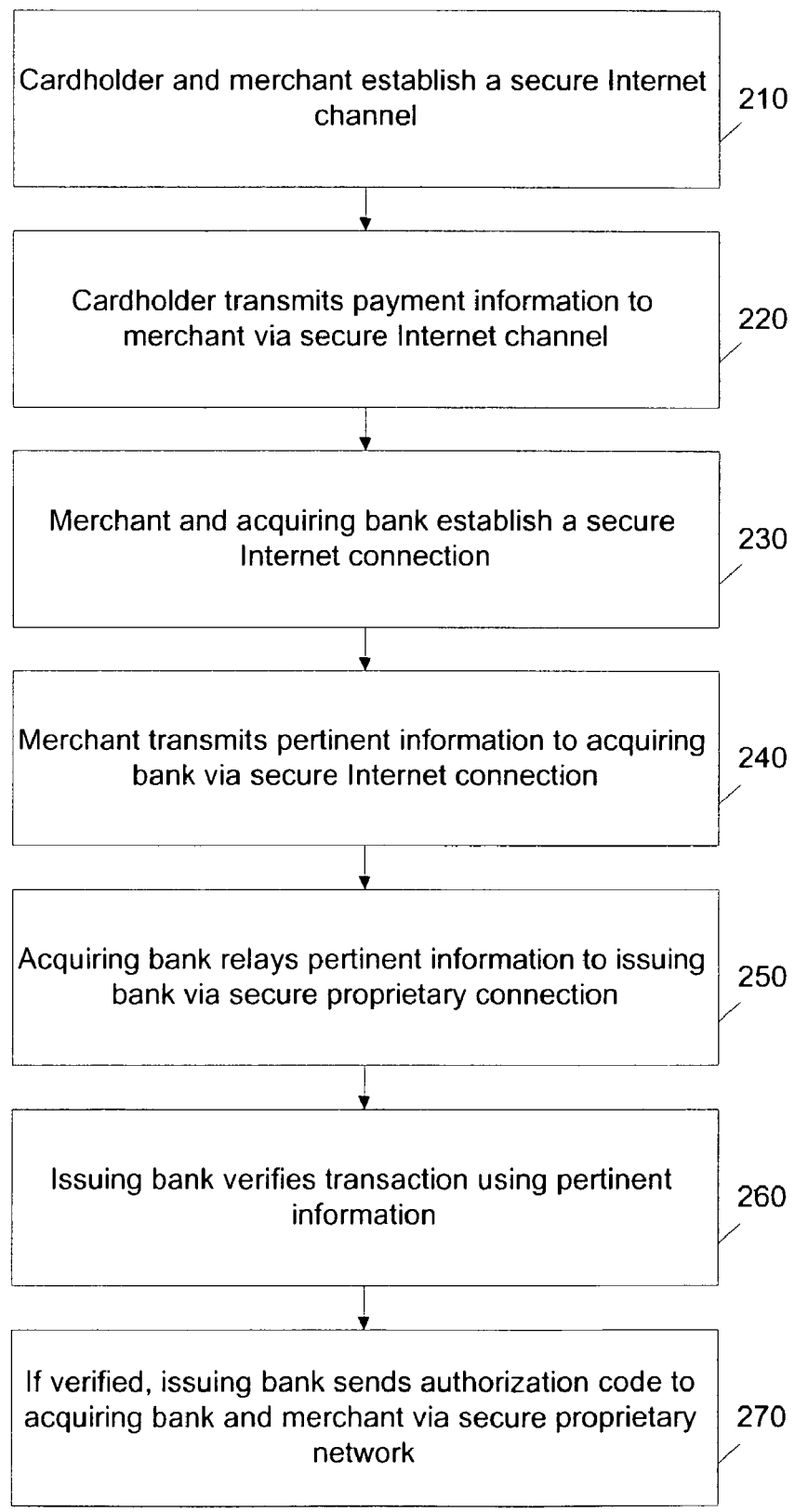
FIG. 2 is a flowchart detailing a typical authorization algorithm used in connection with the conventional online purchase transaction shown in FIG. 1.

The authorization phase of a transaction typically begins when the cardholder enters the checkout page of the merchant's Web site. At that point, the cardholder's Web browser and the merchant's Web server establish a secure Internet communications channel through encryption (FIG. 2—step 210). This is often accomplished by imposing a security protocol such as SSL underneath the HTTP protocol to create a secure HTTP connection known as HTTPS. FIG. 1 illustrates the authorization phase of a conventional online purchase transaction (i.e., without cardholder authentication). As illustrated in FIG. 1, through this channel, the cardholder 100 is able to securely transmit her payment information 10, perhaps including, without limitation, her card type, card number, expiration date, billing information, shipping information, shipping method, and/or coupon codes (FIG. 2—step 220). Upon reception of the cardholder's payment information, the merchant 110 establishes a secure Internet connection with the acquiring bank and relays the pertinent information 20 from the cardholder's payment information to the acquiring bank 130 (FIG. 2—steps 230 and 240).

Software at the acquiring bank 130 transmits this information 30 to the issuing bank 120 through the secure proprietary network (FIG. 2—step 250). Once the issuing bank receives this information, its software checks the information to see if the transaction is legitimate and can be verified (FIG. 2—step 260). If the issuing bank 120 does verify the transaction, it sends an authorization code 40 through the secure proprietary network to both the merchant 110 and the acquiring bank 130 (FIG. 2—step 270). If the merchant 110 does receive an authorization code, it may inform the cardholder 100, through a secure Internet connection, that the transaction was successful 50. FIG. 2 provides a flow chart that tracks the authorization phase as detailed above.

Request for Funds

Once the merchant receives the authorization code, it sends a request for funds, through a secure Internet connection, to the acquiring bank. The acquiring bank forwards this request, through the secure proprietary network, to the issuing bank. Upon receiving this request, the issuing bank may debit the cardholder's account to reflect the additional amount that she owes the bank from the transaction and may also add that amount to the total amount it owes to the acquiring bank for all transactions occurring that business day.

Funds Transfer

At the end of the business day, the issuing bank will wire the money that it owes the acquiring bank from all transactions accruing that business day. In turn, the acquiring bank will wire the money that is owed to the merchant into the merchant's own bank account, perhaps taking out a percentage of that amount as a processing fee. At the end of each monthly cycle, the issuing bank sends the cardholder her card statement reflecting the various transactions made during that month and the amounts owed from those transactions.

Three Party Authentication Method (Current State of Art)

Figure 3:
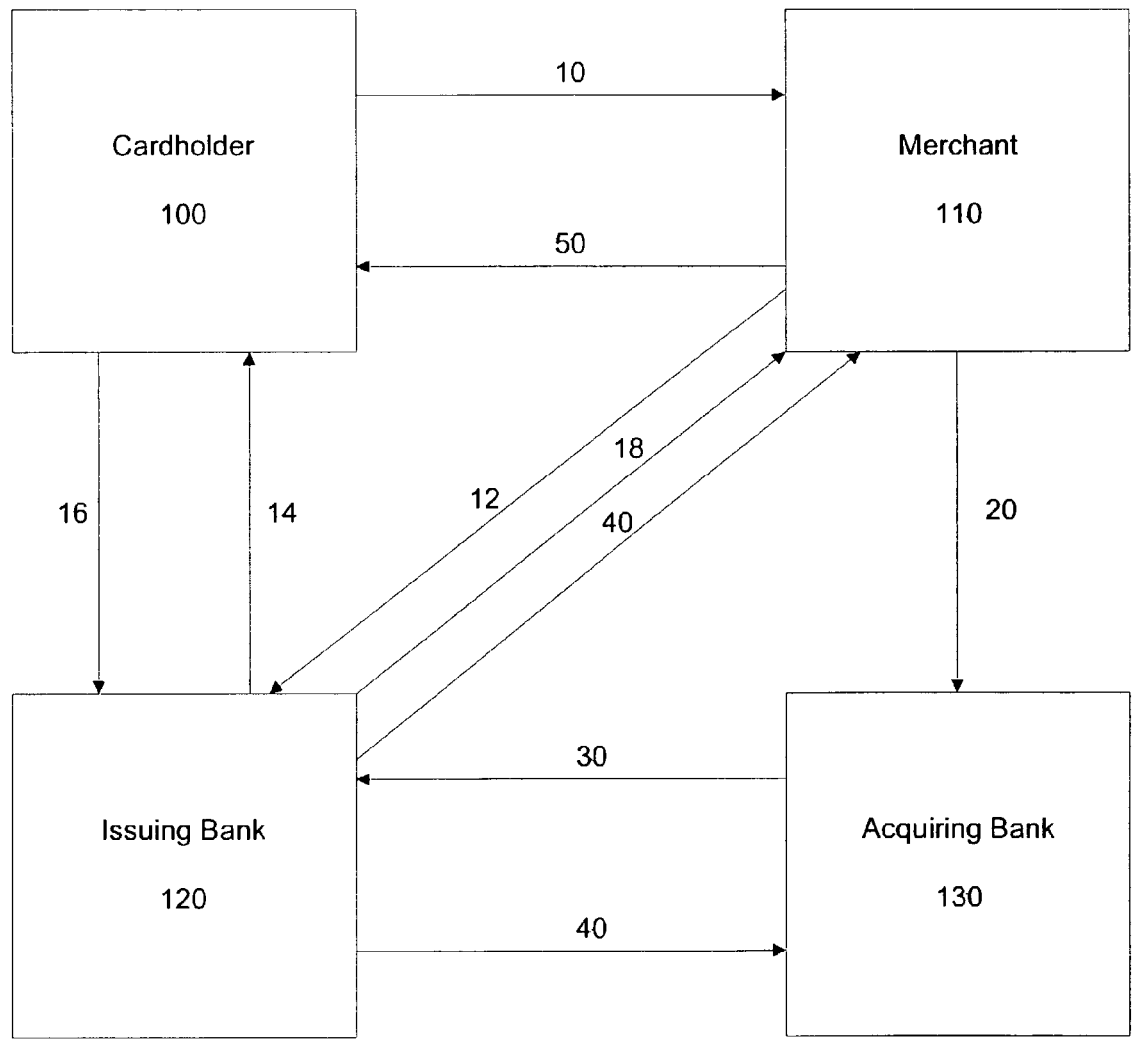
FIG. 3 illustrates the current state of the art prior to this application, namely, a generic three party authentication method for a typical online purchase transaction.
Figure 4:
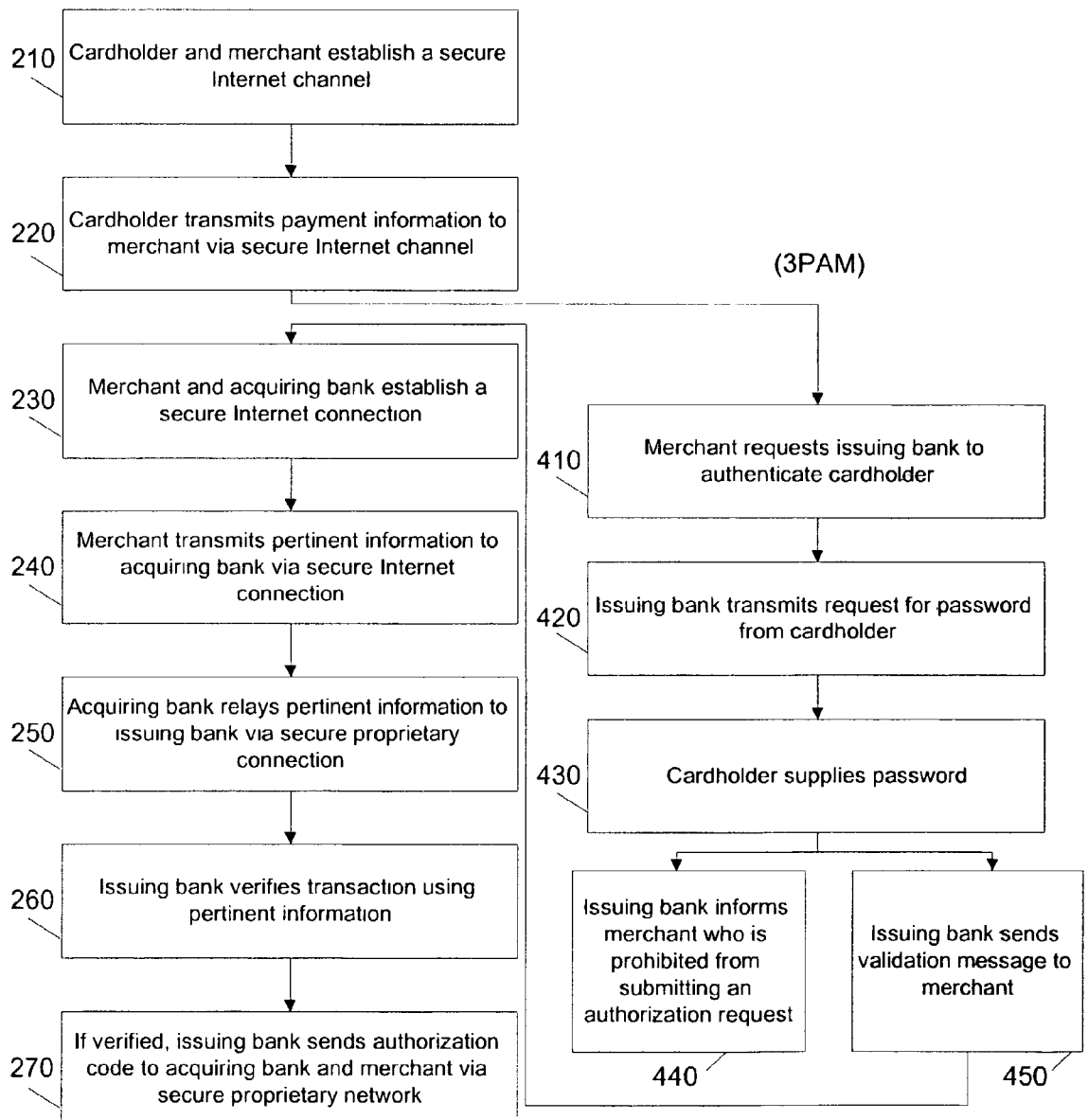
FIG. 4 is a flowchart detailing a typical authorization algorithm used in connection with the three party authentication method shown in FIG. 3.

When a cardholder authentication scheme is imposed upon the above online purchase transaction, further communications occur between the parties. When a generic three party authentication method ("3PAM") is used on the Web as illustrated in FIG. 3, after the cardholder 100 securely transmits her payment information 10 to the merchant 110 through a secure Internet connection, the cardholder is authenticated by the issuing bank. In 3PAM, such authentication may occur in a variety of ways. For example, the cardholder may initiate the authentication step with the issuing bank directly. Alternatively, the cardholder may transmit authentication data to the merchant as part of the initial communication with the merchant. In yet another 3PAM embodiment, as shown in FIG. 3, the merchant 110 transmits a request 12 to the issuing bank 120 to authenticate the cardholder (FIG. 4—step 410). Such a request 12 may either be transmitted through a secure Internet connection or a proprietary network connection. Upon receiving the request, the issuing bank 120 will transmit its own request 14, perhaps through a secure Internet connection, for an authentication password from the cardholder 100 (FIG. 4—step 420). In response, the cardholder 100 supplies the authentication password 16 to the issuing bank 130 (FIG. 4—step 430). If the authentication password is correct, the issuing bank 120 sends a validation message 18 to the merchant 110 and the merchant 110 then continues with the conventional purchase process of relaying pertinent information 20 to the acquiring bank 130 and ultimately to the issuing bank 120 to authorize the purchase (FIG. 4—step 450). The validation message 18 may be sent from the issuing bank to the merchant through a secure Internet connection or a secure proprietary network connection. If the authentication password fails, the issuing bank informs the merchant who is then prohibited from submitting an authorization request for the purchase. FIG. 4 provides a flowchart that tracks one 3PAM embodiment in an online purchase transaction (FIG. 4—step 440).

As earlier noted, one example of 3PAM is MasterCard's SPA. In SPA, a cardholder registers with its issuing bank, which participates in the SPA protocol. Upon such registration, the cardholder obtains an SPA wallet that is downloaded to her computer. When the cardholder enters the checkout phase of an online purchase transaction, the merchant Web site will include hidden fields in its request to the cardholder for payment information. Such hidden fields, may include, for example, a card acceptor name, a card acceptor ID, a card acceptor city, a card acceptor state/country code, a currency code, a sale amount, an optional unpredictable number and a blank hidden field for authentication data.[3] Upon receiving the request for cardholder payment information, including the hidden fields, the cardholder's SPA wallet is invoked and enters into a cardholder authentication session (including providing the requested authentication data) with an SPA wallet server at the issuing bank. Upon successfully authenticating the cardholder, the SPA wallet server generates, stores, and provides to the cardholder a unique transaction token for the purchase transaction known as an Accountholder Authentication Value ("AAVs"). The AAV may be, for example, a 32-bit unique transaction token that may be used to bind the cardholder to the transaction in cases of dispute. At the cardholder site, the AAV is entered into the blank hidden field for authentication data and subsequently transmitted, along with other cardholder payment information to the merchant. The merchant then sends the AAV, along with other pertinent information to the acquiring bank for authorization. In turn, the acquiring bank passes the AAV and other pertinent information to the issuing bank. Upon receiving the AAV, the SPA wallet server at the issuing bank validates the AAV before the order is authorized.

[3] The "authentication data" may be regarded as a form of authentication password.

Another example of 3PAM is Visa's 3-D Secure. Visa's 3-D Secure is described in further detail later in this Detailed Description and has been selected as the exemplary 3PAM model in connection with which the techniques disclosed herein shall be described. However, those skilled in the art will recognize that all the techniques herein may be applied to any embodiment of 3PAM, including without limitation, MasterCard's SPA, and other multi-party authentication protocols as well.

3PAM with Wallets for Information Presentation

One shortcoming of a pure 3PAM implementation is that a customer with multiple cards would need to keep track of multiple authentication passwords, each relating to a different card. Similarly, in a pure 3PAM implementation, the cardholder must manually provide his credit card number, address, and still other types of payment information, which may be difficult or inconvenient to keep track of.

We disclose that the use of a wallet in conjunction with 3PAM addresses this problem. As used herein, the term wallet refers to any device or service storing information which may be used by an individual in connection with a transaction. For example and without limitation, one embodiment of a wallet may be located on a third party server. A cardholder may enroll or register with the wallet by storing her payment information for multiple cards (or only one card if desired) with the wallet. Typically, the wallet has an access password controlling access to the payment information.

In a yet more sophisticated version of 3PAM with a wallet, usable where the cardholder participates in a 3PAM scheme, the cardholder's payment information contained in the wallet may further include an authentication password related to the card. However, we are unaware of any wallets that have been configured in this manner as of the priority date of this application. The access password and the authentication password are different in functionality[4] as the former is used simply for access to wallet, whereas the latter is used for proving one's identity to the payment system.

[4] A cardholder could, of course, elect to use the same data for both types of passwords, but they would still be functionally distinct from each other.

When a cardholder participates in an online purchase transaction thereafter, rather than directly entering payment information herself, she can obtain her payment information by accessing the wallet (possibly through a Web link provided on the merchant's checkout page). In order to access her payment information stored with the wallet, however, the cardholder must also supply the wallet with an access password to access the wallet. Once it has verified the access password, the wallet may automatically fill in the merchant's checkout page with the cardholder's payment information (depending upon which card the cardholder decides to use). Again, we are unaware that any wallets have been so configured as of the priority date of this application.

Some currently available commercial products which may be configured to serve as such wallets include, for example and without limitation, Microsoft's .NET Passport and AOL's QuickCheckout. However, we are unaware that such products have actually being used in this fashion as of the priority date of this application.

Those skilled in the art will also recognize that the foregoing is merely illustrative of one possible embodiment of a wallet. For example and without limitation, rather than residing on a third party server, a wallet might be implemented as a software component on the cardholder's own computer or as a service residing on a merchant's server (e.g., Amazon's 1-Click Service).

Figure 5:
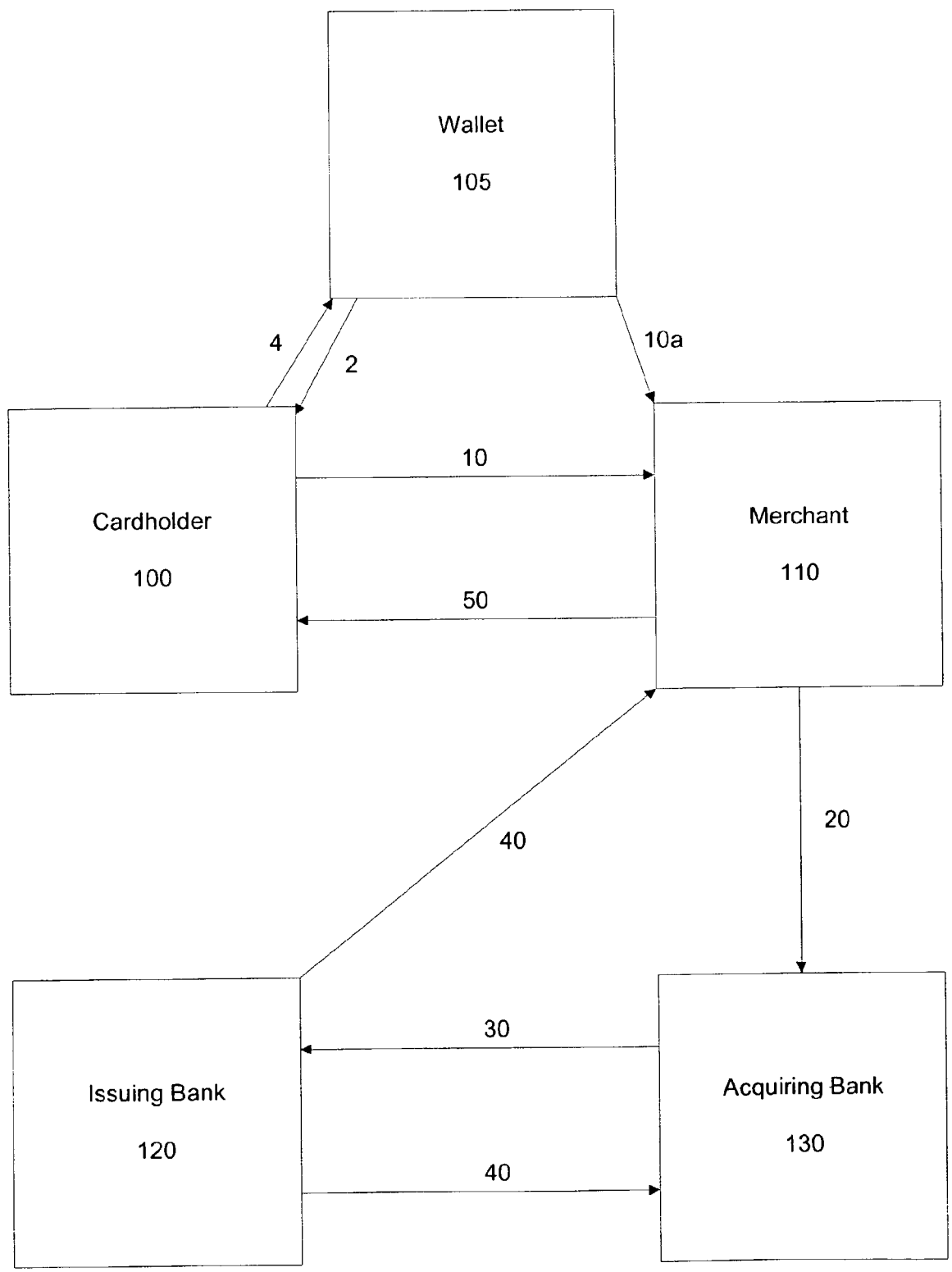
FIG. 5 illustrates a generic three party authentication method incorporating a wallet for presentation of certain payment information to the merchant or the cardholder.

As illustrated in FIG. 5, a wallet can be used in a 3PAM cardholder authentication scheme. When 3PAM with a wallet is used on the Web, rather than having the cardholder transmit her payment information directly to the merchant through a secure Internet connection as was the case in FIGS. 1 and 3, the cardholder's payment information may already be stored with the wallet. Therefore, when the cardholder enters the merchant's checkout process, the wallet may be invoked (either automatically or manually, for example and without limitation, through a Web link to the wallet on the merchant's checkout Web page) to assist the cardholder in the purchase transaction. The wallet 105 transmits a request 2 through a secure Internet connection for an access password from the cardholder 100. In response, the cardholder 100 supplies the access password 4 to the wallet 105. If the access password fails, the wallet will not allow the cardholder to access payment information stored in it. If the access password is correct, the cardholder is able to access payment information for various cards (or only one card) that she may have previously registered with the wallet. When the cardholder selects a particular set of payment information related to a specific card to use in the purchase transaction, the wallet 105 either transmits this payment information 10*a*, possibly through a secure Internet connection, to the merchant 110 and/or automatically fills in the checkout Web page with the payment information such that the cardholder can select a "confirm" or "buy" button on the Web page to validate or send the information 10 to the merchant herself. Either way, once the merchant 110 receives the payment information, it then continues with the conventional purchase process of relaying pertinent information 20 to the acquiring bank 130 and ultimately to the issuing bank 120 to authorize the purchase. The functionality needed to transmit the payment information from the wallet could be implemented as a modification to standard plug-in software used by the cardholder.

Those skilled in the art will recognize that the foregoing illustration of how the wallet interacts with the merchant and cardholder is merely an example and there exist a number of different ways that would achieve the same authentication effect.

Yet another embodiment of the wallet offers the cardholder an option to either (1) participate in a conventional 3PAM authentication scheme or (2) participate in a 3PAM authentication scheme incorporating wallets. Specifically, when the issuing bank requests an authentication password 14 from the cardholder, the request (possibly in the form of a pop-up window on the cardholder's Web browser) may contain an option to supply an authentication password 16 to the issuing bank 120, as in FIG. 3, or supply an access password 4 to the wallet 105, as in FIG. 5. In this embodiment, one password (either to authenticate the cardholder to the issuing bank, or to access the wallet) can be used rather than two separate passwords (respectively, to authenticate the cardholder to the issuing bank, and to access the wallet), obviating the need to modify current commercial implementations of wallets. This embodiment is useful for backwards compatibility, i.e., for cardholders who entirely lack wallets or whose wallets lack sufficient capability to accommodate authentication passwords and must therefore provide such authentication passwords directly (without wallets) as in the preceding section.

Four Party Authentication Method (4PAM)

In the foregoing section, the wallet itself is not a direct participant in the authentication process. That is, although the wallet may contain the authentication password, the wallet merely provides the password to the cardholder or the merchant—as opposed to providing the authentication password to a party that is actively involved in the authentication process (for example and without limitation, the issuing bank).

We disclose herein a four party authentication method (for convenience, "4PAM") that combines certain of the advantages of a wallet (e.g., single password access to payment information of multiple cards) with 3PAM to provide the capability to store the authentication passwords and/or transmit them to an issuing bank (and/or other authenticating party) interacting with the wallet. Because the generalization as contemplated herein includes additional capabilities involving direct communication with a party involved in the authentication process (e.g., the issuing bank, either per se or via cardholder)—as opposed to the purely informational capabilities of the simpler wallets described earlier—we shall refer to the generalized wallets contemplated herein as "general authenticators" (or "GAs"). So, as the name indicates, 4PAM involves at least four parties participating in the cardholder authentication process: the cardholder, the merchant, the issuing bank, and the GA.[5]

[5] We originally used "3PAM" to refer to the scenario where at least 3 parties were participating in authenticating the cardholder. Then, in a subsequent section entitled "3PAM with Wallets for Information Presentation," we introduced the concept of a fourth party (i.e., the wallet) containing and providing an authentication password to the merchant (either directly or via the cardholder), but where the authentication process otherwise performed in the conventional manner (i.e., the authentication information is passed to the issuing bank through the merchant and the acquiring bank). In the current section entitled "Four Party Authentication Method"—which represents a deviation from the standard 3PAM technique—a more generalized form of wallet (now known as a "GA") becomes involved in authenticating the cardholder. With the increased participation of the fourth party (i.e., the GA), we therefore refer to the technique as "4PAM." In any event, our reference to a technique as involving 3 or 4 parties is merely for convenience, and should not be regarded as definitional or restrictive.

Figure 6:
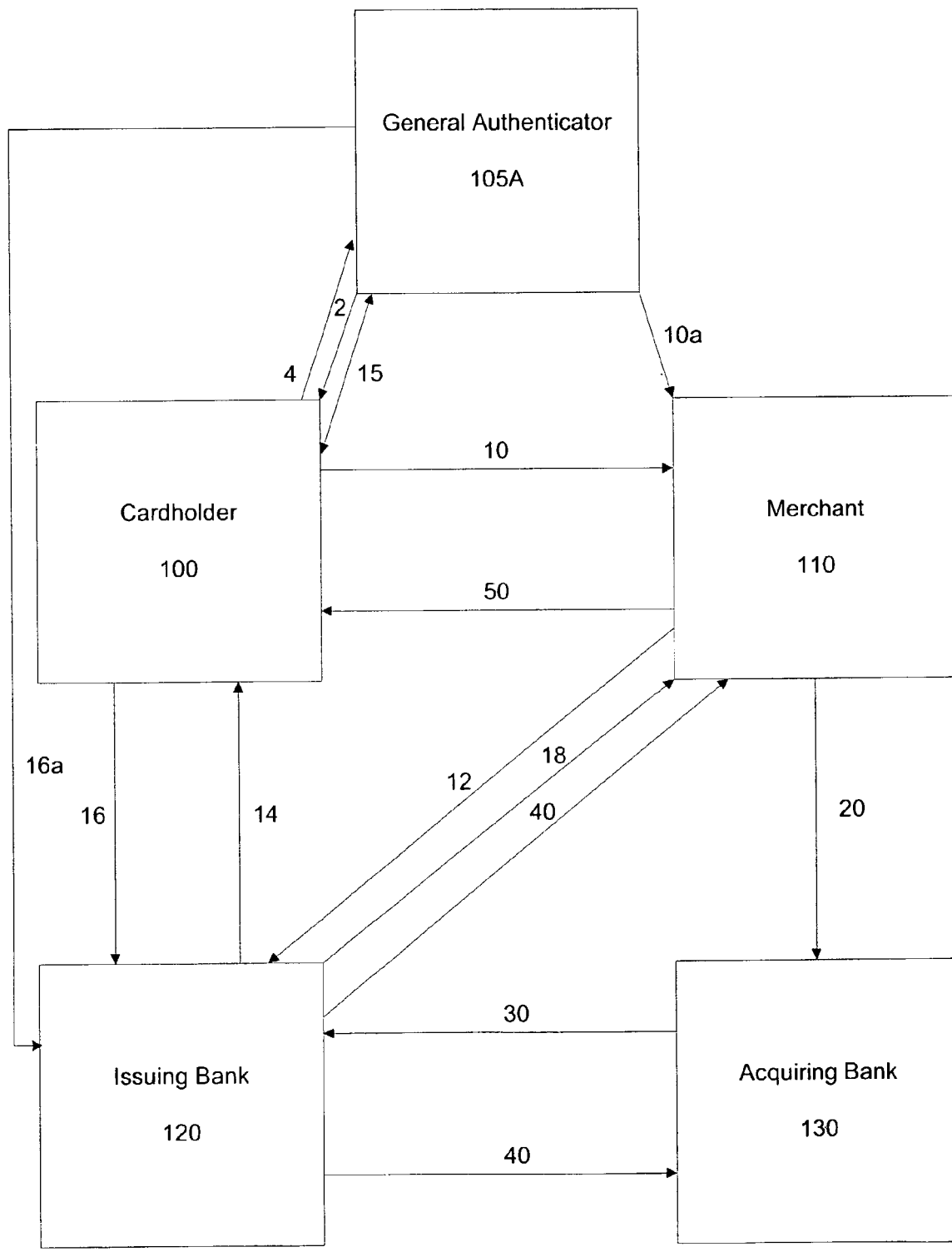
FIG. 6 illustrates an exemplary embodiment of a four-party authentication method, in which a general authenticator participates in the process of authenticating the cardholder to the issuing bank.

As illustrated in FIG. 6, when the cardholder enters the merchant's checkout process, the GA may be invoked (either automatically or manually, for example and without limitation, through a Web link to the GA on the merchant's checkout Web page) to assist the cardholder in the purchase transaction. The customer's plug-in software could even be modified to inform the merchant that the customer is associated with a GA. There could even be a hidden field in the buy message posted to the merchant to indicate the details of the GA. The GA 105A transmits a request 2 through a secure Internet connection for an access password from the cardholder 100. In response, the cardholder 100 supplies the access password 4 to the GA 105A. If the access password fails, the GA will not allow the cardholder to access payment information stored in it. If the access password is correct, the cardholder is able to access payment information for various cards (or only one card) that she may have previously registered with the GA. Such payment information for each card may possibly include an authentication password related to the card. When the cardholder selects a particular set of payment information related to a specific card to use in the purchase transaction, the GA 105A either transmits this payment information 10a, possibly through a secure Internet connection, to the merchant 110 and/or automatically fills in the checkout Web page with the payment information such that the cardholder can select a "buy" or "purchase" button on the Web page to validate or send the information 10 to the merchant herself. The functionality needed to transmit the payment information from the GA could be implemented as a modification to standard plug-in software used by the cardholder. (To this point, the portion of 4PAM described in this paragraph is the same as that described in the preceding section.) Either way, once the merchant 110 receives the payment information, it then transmits a payment authorization request 12 to the issuing bank 120 to authenticate the cardholder. Such a request 12 may be either transmitted through a secure Internet connection or a proprietary network connection. A typical request 12 might contain the URL (or other contact information) of the issuer, as before, and perhaps also the URL (or other contact information) of the GA in order to allow the issuing bank to establish contact with the GA. Such information would be provided by merchant software (and/or hardware), suitably modified from the version used in a 3PAM implementation. The customer's plug-in software could be modified so that, when a payment authorization request comes from the merchant, the plug-in establishes a connection with the issuer and/or the GA.

Upon receiving the merchant's payment authorization request 12, the issuing bank 120 will transmit its own request 14, possibly through a secure Internet connection, for an authentication password from the cardholder 100. Because the cardholder has already invoked the GA 105A, she can now either request 15 that the GA send the authentication password 16a to the issuing bank 120 directly or indirectly (by supplying the cardholder with the authentication password 16a such that she can send it to the issuing bank herself). Or, if the payment authorization request 12 contains the URL (or other contact information) for the GA, the issuing bank can itself establish contact with the GA.

As necessary, the issuer may also be configured so as to be able to specially recognize the authentication message from the GA. This, of course, depends on the implementation being deployed. For example, in an implementation where the authentication message is signed by the private key of the GA, the issuer software (and/or hardware, if appropriate) should be configured to access the GA's public key in order to decrypt the authentication message.

By participating in the authentication process in this fashion, the GA allows the system to bypass the conventional routing through the merchant[6] and the acquiring bank. If the issuing bank 120 determines that the authentication password 16a is correct, the issuing bank 120 sends a validation message 18 to the merchant 110, and the merchant 110 then continues with the conventional purchase process of relaying pertinent information 20 to the acquiring bank 130 and ultimately to the issuing bank 120 to authorize the purchase. The validation message 18 may be sent from the issuing bank to the merchant through a secure Internet connection or a secure proprietary network connection. If the authentication password fails, the issuing bank informs the merchant who is then prohibited from submitting an authorization request for the purchase.

[6] Unless, of course, the GA is located on the merchant web site. The authentication password can, but no longer necessarily, has to be forwarded through the merchant. Thus, the merchant's degree of participation in the authentication scheme is typically reduced compared to the standard 3PAM implementation, or even compared to 3PAM with wallets. In addition, the routing of authentication information through the acquiring bank can be eliminated.

Those skilled in the art will recognize that the foregoing illustration in FIG. 6 may be altered in alternative embodiments while still achieving the same authentication effect. For example and without limitation, another embodiment may not have the GA participate in providing payment information other than an authentication password, as was illustrated in FIG. 6. In such an embodiment, the GA is invoked after payment information (other than the authentication password) is submitted to the merchant by the cardholder. That is, when the issuing bank 120 transmits a request 14 for an authentication password from the cardholder 100, she may then invoke the GA and supply an access password 4 to the GA in order to access the authentication password related to her card which is stored with the GA. In response, the GA may either send the authentication password 16a directly to the issuing bank or supply it to the cardholder who submits it 16 herself to the issuing bank. Similarly, depending upon where an embodiment deploys the GA, certain requests as illustrated may be obviated. For example and without limitation, if the GA is located on the cardholder's computer, then there would be no need to transmit request 2 or receive an access password 4 through a secure Internet channel—such transmissions would be performed internally, in the cardholder's own computer.

Furthermore, in other embodiments, once a GA has been invoked for a particular online session, it may be unnecessary for the cardholder to continually supply an access password 4 to the GA in order to access her payment information, including her authentication passwords, for multiple purchase transactions during the session. For example and without limitation, in an embodiment that is implemented on the Web, an encrypted cookie may be stored on the cardholder's computer, such that the encrypted cookie (and thus the access password) would be automatically transmitted to the GA on a subsequent purchase transaction, obviating the need for the cardholder to once again manually provide the GA with her access password to access the payment information stored in the GA. This would, in effect, eliminate the need to transmit the request 2 and access password 4 in a subsequent purchase transaction. The functionality needed to store and use such a cookie could be implemented as a modification to standard plug-in software used by the cardholder.

Furthermore, in another embodiment, a GA 105A may maintain multiple authentication passwords related to multiple cards, and may transmit an authentication password 16a, directly to the relevant issuing bank 120.

3-D Secure (Current State of Art)

When schemes such as 3PAM and 4PAM are deployed on the Web, certain notable issues regarding the HTTP and TCP/IP protocols arise. In this section, Visa's 3-D Secure implementation of 3PAM will be detailed, highlighting such issues. While the descriptions herein refer to 3-D Secure as deployed on the Web, those skilled in the art will recognize that such issues can arise in any network environment with any application level protocol and underlying network protocol.

Figure 7:
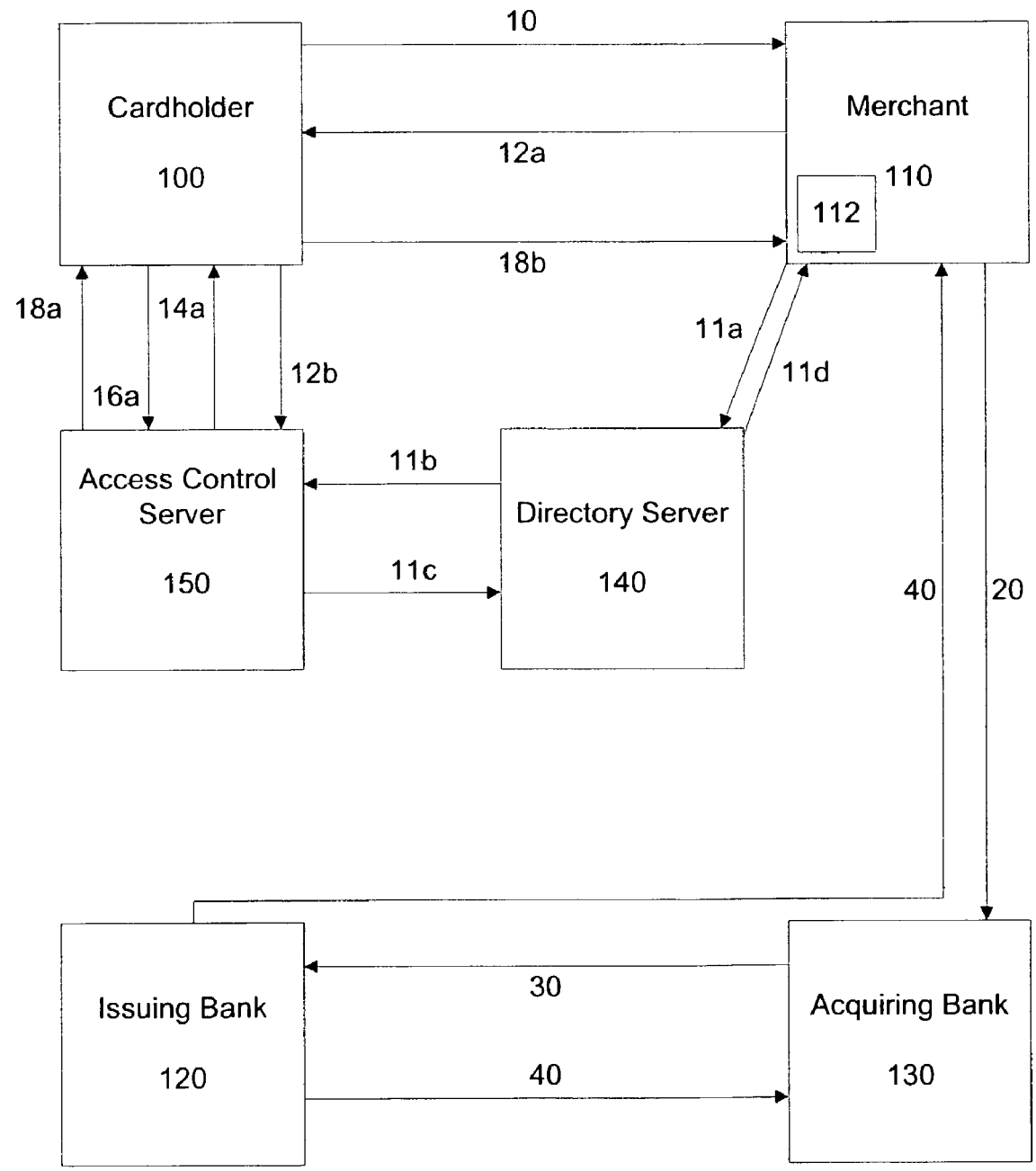
FIG. 7 illustrates an exemplary (e.g. the Visa 3-D Secure) cardholder authentication protocol.

As illustrated in FIG. 7, after the cardholder 100 securely transmits her payment information 10 to the merchant, either manually or through a GA, the plug-in software 112 related to the Web commerce server 110 of the merchant transmits a request 11a to a Directory Server ("DS") 140 operated by Visa to determine whether the cardholder participates in the 3-D Secure protocol. Specifically, the DS checks its local memory to determine whether there exists a participating card range that includes the cardholder's card. If there exists a participating card range, the DS 140 then transmits a request 11b to an Access Control Server ("ACS") 150 to determine whether the individual cardholder participates in the 3-D Secure protocol (e.g., cardholder has enrolled in the "Verified by Visa" program). The ACS may be operated by the issuing bank, its processor or Visa, on behalf of the issuing bank. If there is no appropriate card range or the individual cardholder does not participate in 3-D Secure, the DS informs the merchant plug-in software and the merchant plug-in software returns the transaction to the merchant's Web commerce server which then processes the transaction without any cardholder authentication. However, if the ACS 150 sends a confirmation 11c to the DS that the individual cardholder participates in 3-D Secure, the DS 140 returns a Uniform Resource Locator ("URL") 11d of the ACS 150 to the merchant's plug-in software 112 (such URLs may also, for example and without limitation, be publicly accessible). In turn, the merchant's plug-in software 112 forwards a message 12a including a Payer Authentication Request ("PAReq") to the cardholder's Web browser 100, further instructing the cardholder's Web browser 100 to transmit the PAReq 12b to (e.g., the URL of) the ACS 150. Included in this message 12a may be, for example and without limitation, JavaScript, or any other type of programming language which enables executable content to be distributed over the Internet, directing the cardholder's Web browser 100 to transfer the PAReq 12b to the ACS 150. Because the cardholder's Web browser 100 transmits the PAReq 12b to the URL of the ACS 150, the ACS acquires enough location information (for example and without limitation, the IP address and port number of the listening cardholder's Web browser) to be able to communicate directly with the cardholder's Web browser in order to obtain the authentication password. Specifically, the ACS transmits a request 14a to the cardholder's Web browser for an authentication password and thereafter, the cardholder 100 supplies the ACS 150 with such an authentication password 16a. If the ACS 150 verifies the cardholder's authentication password, it generates a message 18a including a Payer Authentication Response ("PARes") and forwards the message to the cardholder's Web browser 100, instructing the cardholder's Web browser 100 to transmit the PARes 18b to the merchant's plug-in software 112. Included in the PARes is an indication whether the transaction has been verified by the ACS. Once the merchant's plug-in software 112 receives the PARes including the verification by the ACS, it returns the transaction to the merchant's Web commerce server 110 which then relays pertinent information 20 to the acquiring bank 130 and ultimately to the issuing bank 120 to authorize the purchase as in a conventional online purchase transaction. If the merchant 110 receives an authorization code 40, it may then inform the cardholder 100, through a secure Internet connection, that the transaction was successful 50.

Skeleton Message Enhancement to 3PAM Implementations

As described in the foregoing and illustrated in FIG. 7, the 3-D Secure scheme utilizes a forwarding technique where the merchant's plug-in software 112 forwards a message 12a including a PAReq to the cardholder's Web browser, instructing the cardholder's Web browser 100 to transmit the PAReq 12b to (e.g., a URL of) the ACS 150. This technique is employed, in part, to allow the ACS to subsequently send a request 14a to the cardholder for an authentication password. However, if the cardholder's Web browser does not first establish a TCP/IP connection (including a source IP address and port number), the ACS will be unable to "locate" the cardholder's Web browser (e.g., a listening port). As such, by having the merchant's plug-in software forward the PAReq through the cardholder's Web browser to the ACS, the cardholder's Web browser effectively informs the ACS of a location (e.g., IP address and port number) to send the request for an authentication password. While this technique is described specifically within the context of 3-D Secure, the Web, HTTP, and TCP/IP, those skilled in the art will recognize that this technique, as well as the use of skeleton messages, can be generalized to include any scheme in any network environment in which a first party must first establish a communication channel with a second party before the second party can communicate with the first party.

Figure 8A:
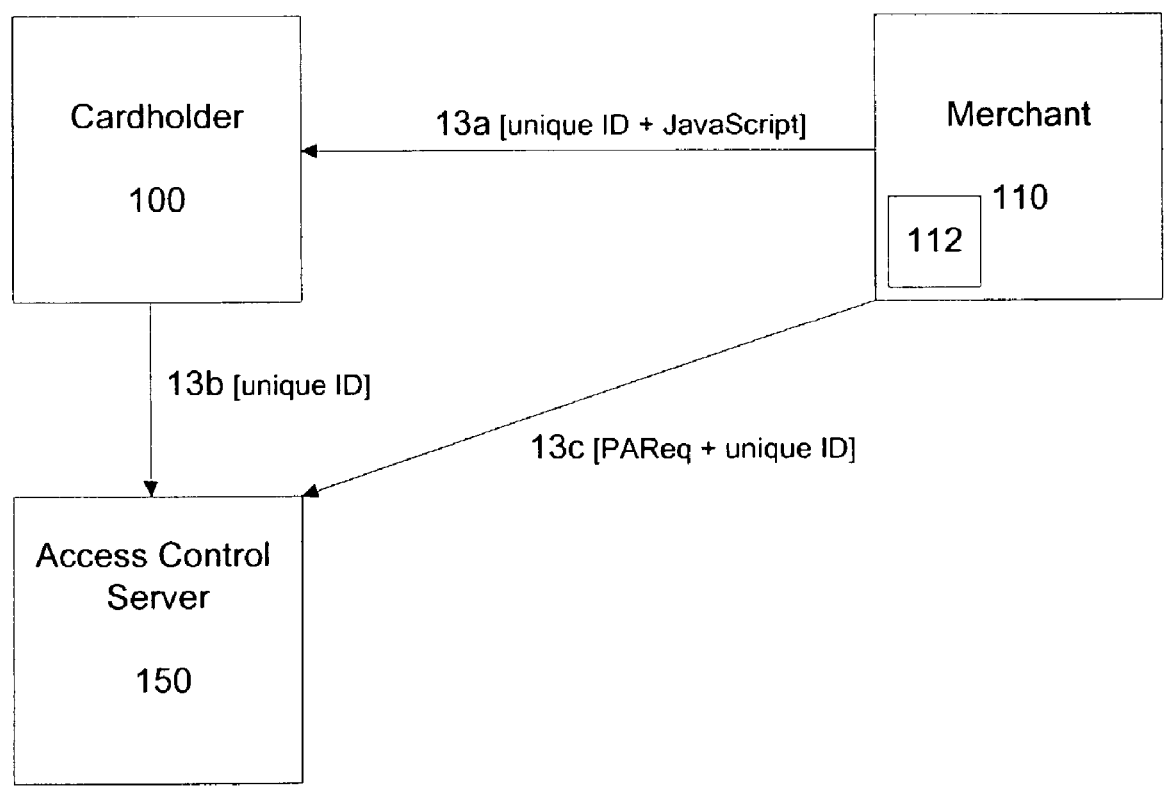
FIG. 8A illustrates a first exemplary implementation of the 3-D Secure protocol enhanced with the use of skeleton messages.

We introduce the concept of a "skeleton message" to reduce or minimize the forwarding of information through a forwarding party in order to establish a communication channel between the sending party and the ultimate receiver of the information. For example and without limitation, in 3-D Secure, the PAReq message that is sent from the merchant to the ACS (by way of the cardholder computer) is often a large message containing in part, a merchant ID, merchant name, merchant URL, order number, purchase date, purchase amount, a primary account number, an order description, and/or a purchase number. In an exemplary implementation that can be implemented in connection with Visa's 3-D Secure scheme, as illustrated in FIG. 8A, instead of transmitting the PAReq through the cardholder, the merchant's plug-in software 112 may send a message 13a including a unique[7] transaction identifier to the cardholder's Web browser further instructing the cardholder's Web browser 100 to transmit the unique identifier to the URL of the ACS 150. The unique identifier may be, without limitation, separately generated by the merchant such as, for example and without limitation, a random number or a hash of all the underlying fields of the PAReq, or a specific field of the PAReq, such as the purchase number, that is unique to the transaction. The message may, for example and without limitation, take the form of or be implemented via JavaScript, or any other type of programming language which enables executable content to be distributed over the Internet.

[7] It is not necessarily that the identifier be unique in an absolute sense, only that it be sufficiently unique to enable this transaction to be distinguished from other transactions of concern.

After sending the unique identifier 13b through the cardholder 100 to the ACS 150, the merchant's plug-in software 112 is then able to directly send a message 13c including the large PAReq and the unique identifier (if it is not already included in the PAReq) to the ACS. The ACS is then able to determine the transaction to which the PAReq belongs by locating the corresponding unique transaction identifier from the two received messages(i.e., message 13b and message 13c).

Figure 8B:
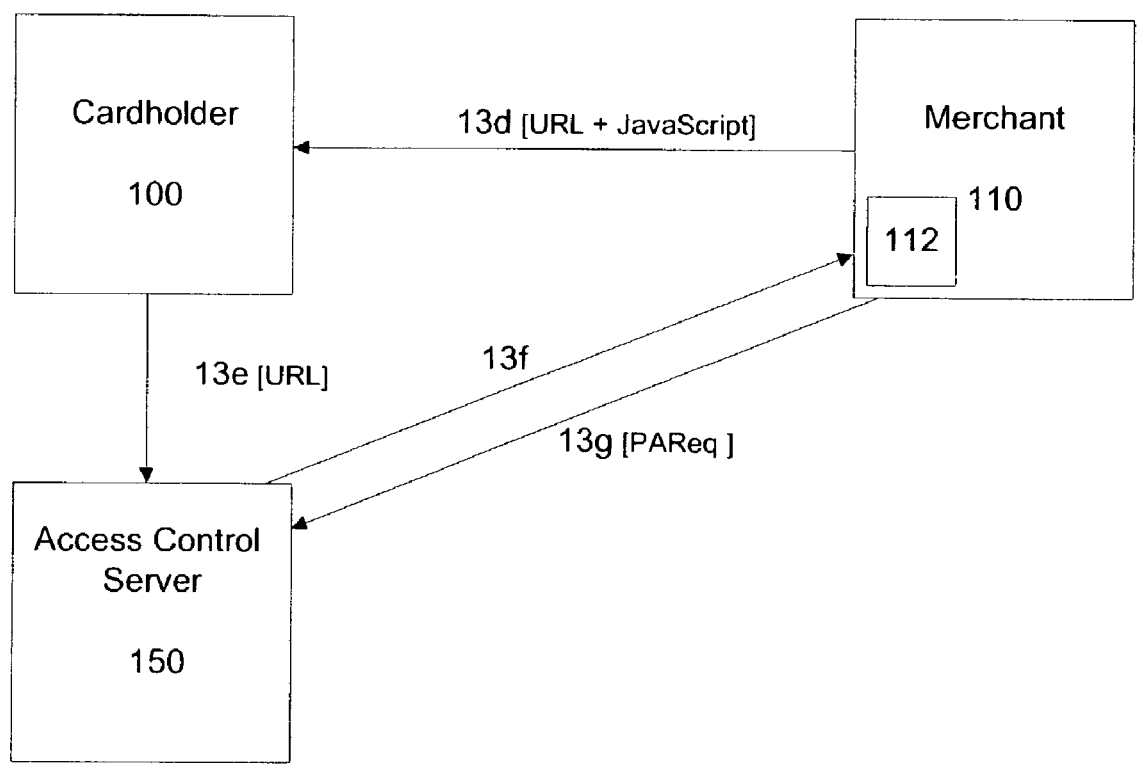
FIG. 8B illustrates a second exemplary implementation of the 3-D Secure protocol enhanced with the use of skeleton messages.
Figure 8C:
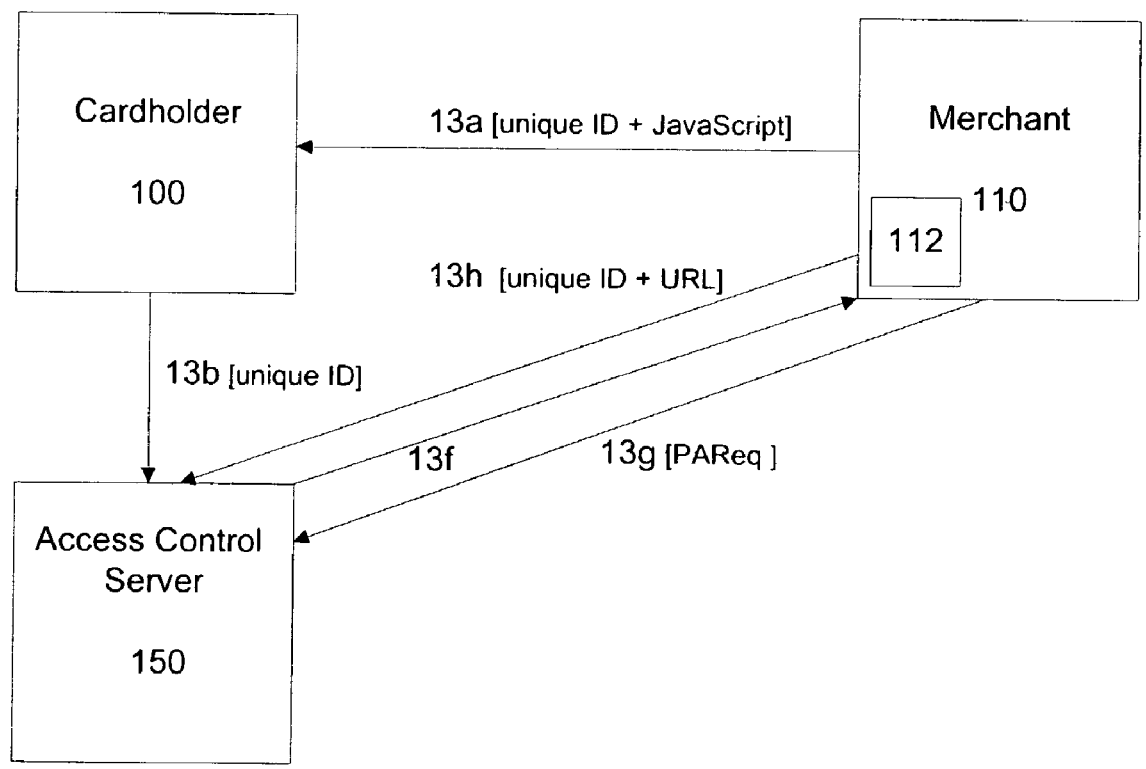
FIG. 8C illustrates a third exemplary implementation of the 3-D Secure protocol enhanced with the use of skeleton messages.

In an alternative exemplary implementation as illustrated in FIG. 8B, the merchant's plug-in software 112 may generate a URL (in the case of the Internet, or any other type of address or locator for the particular network type being used) where the PAReq information is posted, and then send the URL as part of a skeleton message 13d through the cardholder 100 to establish a connection with the ACS 150. Those skilled in the art will recognize that the information in the URLs can include, without limitation, identifiers for documents, images, downloadable files, services, electronic mailboxes, scripts, applets, CGI programs, and any other resource that may be available and accessible on a network. Furthermore, for example and without limitation, as used herein, a URL can be "fully qualified" including a protocol prefix, a server name, a path name, and a resource name, such as specific file ("www.arcot.com/PAReqInformation/transaction123") or it can refer to parts of a fully qualified URL such as the server name ("www.arcot.com"). Upon receiving the URL 13e, the ACS can directly send a request 13f to retrieve the PAReq 13g posted at the URL. In another exemplary implementation, as illustrated in FIG. 8C, the merchant's plug-in software 112 may generate both a URL where the PAReq information is posted as well as a unique identifier. The merchant's plug-in software then sends the unique identifier as a skeleton message 13a through the customer to establish a connection with the ACS and directly sends a message 13h including the URL and the unique identifier to the ACS. The ACS is then able to relate the connection established by the cardholder's transmission of the unique identifier to the URL sent directly by the merchant by correlating the unique identifiers and thereafter retrieve the PAReq 13g posted at the URL.

In all of the foregoing embodiments, then, the merchant transmits an abbreviated version of or proxy for (e.g., a URL, unique identifier, etc.) a more detailed quantity to the ACS via the cardholder, enabling the cardholder to independently locate and access a full description of the quantity it requires, which may be subsequently obtained from the merchant via a separate transmission or obtained by the ACS from a location specified by the merchant.

Those skilled in the art will recognize that the use of skeleton messages may also be used when sending a PARes from ACS to the merchant. Additionally, those skilled in the art will also recognize that the use of skeleton messages is not limited to authentication schemes such as 3-D Secure or networks such as the Web which involve, for example, the HTTP (or HTTPS) application-level protocol or the TCP/IP network protocol. Instead, the skeleton message techniques disclosed herein may be used, for example and without limitation, whenever underlying communication bandwidth between three parties differs widely and messages are transmitted through a forwarding agent. If the available bandwidth for the forwarding agent is limited, rather than sending the entire message (known as the "payload") through the forwarding agent, the sending party could instead send a small skeleton message to the receiving party through the forwarding agent informing the receiving party that the "payload" will be sent directly to the receiving party or can be retrieved at a specified location. Similarly, the relative sizes of the payload message and the skeleton message may be a function of several factors (possibly including bandwidth) known to those skilled in the art.

Similarly, in MasterCard's SPA, skeleton messages may be used to minimize the forwarding of information through a forwarding party in order to establish a relationship between the forwarding party and the ultimate receiver of information. In particular, the hidden fields in the merchant's cardholder payment information request are ultimately forwarded through the cardholder to the issuing bank's SPA wallet server in order to provide sufficient information to authenticate the cardholder and generate an AAV for the purchase transaction. In an exemplary implementation of skeleton messages in SPA, upon the cardholder's submission of payment information to the merchant, the merchant could transmit a message (i.e. the payload) including the hidden fields and a unique identifier directly to the issuing bank's SPA wallet server. Simultaneously, the merchant could send the unique identifier (i.e. the skeleton message) to the cardholder's SPA wallet, which would then forward it to the issuing bank's SPA wallet server. As such, the SPA wallet server would then be able to match the unique identifiers and relate the cardholder to the hidden fields, and thus generate an appropriate AAV and send the AAV either directly to the merchant via the cardholder's SPA wallet.

Elimination of Dispensable Messages in 3PAM Implementations

In authentication protocols as well as many other types of communication protocols, "request and response" exchanges between parties are often used in order to confirm that a subsequent communication exchange may proceed. For example and without limitation, as illustrated in FIG. 7 and detailed earlier in the 3-D Secure description, the merchant's plug-in software 112 sends a request 11a to the DS 140 to determine whether the cardholder participates in the 3-D Secure protocol. If the DS checks its local memory and finds a participating card range that includes the cardholder's card, the DS 140 then transmits a request 11b to the ACS 150 to determine whether the individual cardholder participates in the 3-D Secure protocol (e.g., cardholder has enrolled in the "Verified by Visa" program). If there is no appropriate card range or the individual cardholder does not participate in 3-D Secure, the DS informs the merchant plug-in software and the merchant plug-in software returns the transaction to the merchant's Web commerce server which then processes the transaction without any cardholder authentication. However, if the ACS 150 sends a confirmation 11c to the DS that the individual cardholder participates in 3-D Secure, the DS 140 returns a URL 11d of the ACS 150 to the merchant's plug-in software 112 as an acknowledgement response to the initial request 11a. As the following description illustrates, certain of the foregoing communications exchanges may be dispensable and can be eliminated by various techniques.

Figure 9A:
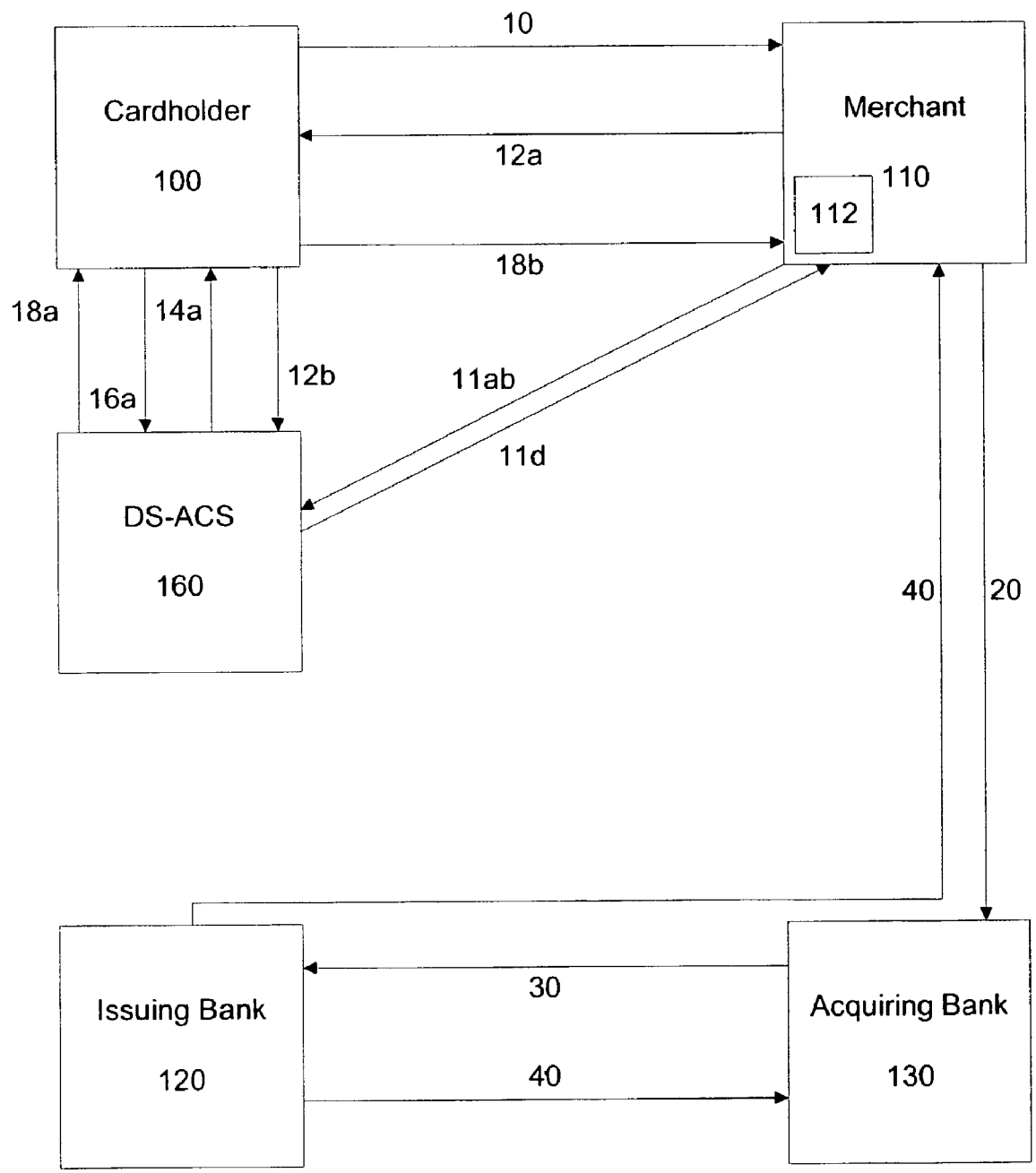
FIG. 9A illustrates a first exemplary implementation of the 3-D Secure protocol enhanced by the elimination of dispensable communication exchanges (combining multiple requests and services).

One exemplary implementation integrates multiple servers possibly serving different functions into a single server, possibly multi-functional server in order to reduce the need to establish different communication channels. For example and without limitation, in the context of 3-D Secure, an exemplary implementation integrates the DS and the ACS into a single server (DS-ACS) thereby eliminating the need to establish network communication channels between the two servers (namely, request 11b and confirmation response 11c). By eliminating the exchanges between the two servers, the implementation reduces the latency times (i.e. start-up times) that occur due to initiating communication channels and also reduces the risk of delays due to the possible failures of such channels. As illustrated in FIG. 9A, an exemplary implementation may also integrate two requests (namely request 11a and request 11b) into a single query 11ab to the DS-ACS. That is, rather than send the two requests separately and wait for two separate confirmation responses (namely response 11c and response 11d), the implementation additionally eliminates latencies (specifically, the start-up latency from request 11b and the start-up and transmission latencies from response 11c) that would have resulted from waiting for such multiple responses.

Figure 9B:
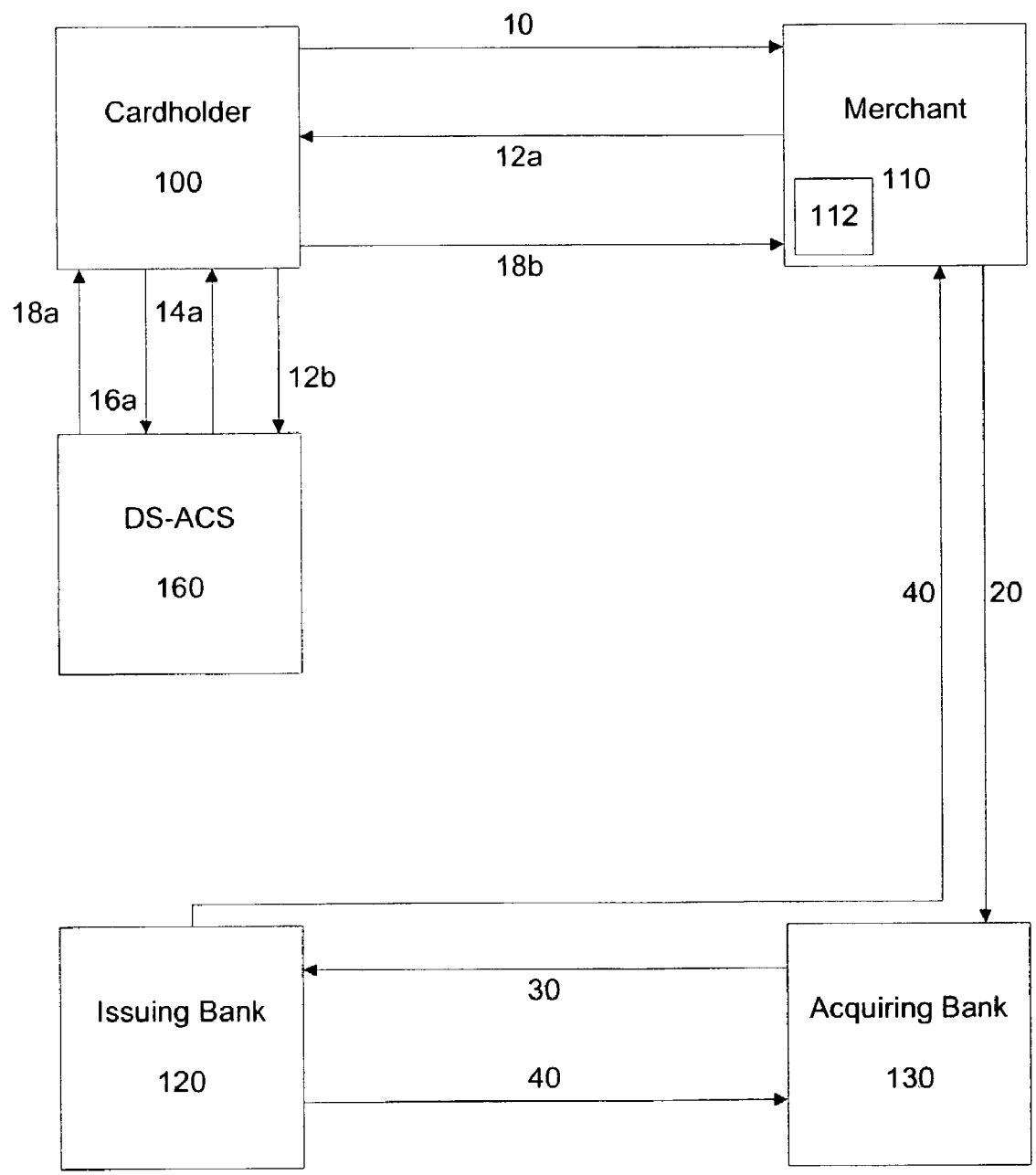
FIG. 9B illustrates a second exemplary implementation of the 3-D Secure protocol enhanced by the elimination of dispensable communication exchanges (elimination by implication).

Another exemplary implementation recognizes that the success of a subsequent communication exchange between parties, by implication, indicates the acknowledgement of a prior request, thereby obviating the need to transmit the request at all. For example and without limitation, in the context of 3-D Secure, transmissions of request 11a and request 11b (or request 11ab), and response 11c and response 11d (or response 11d), which all deal with participation or enrollment in the 3-D Secure protocol, can be eliminated. Specifically, when the merchant's plug-in software 112 sends a message 12a including a PAReq to the cardholder's Web browser, instructing the cardholder's Web browser 100 to transmit the PAReq 12b to the URL of the ACS 150 (or DS-ACS 160, as the implementation may be), the ACS (or DS-ACS) may first verify that the cardholder has enrolled or participates in the 3-D Secure protocol. That is, there is no need for a request to verify—the ACS (or DS-ACS) may perform the participation verification automatically. If the cardholder does not participate, then the ACS (or DS-ACS) informs (possibly through the cardholder's Web browser) the merchant's plug-in software and the merchant's plug-in software returns the transaction to the merchant's Web commerce server which then processes the transaction without any cardholder authentication. However, if the cardholder does participate, then the ACS (or DS-ACS) proceeds with the request 14a to the cardholder's Web browser for an authentication password and continues the conventional 3-D Secure protocol. In another implementation, the ACS (or DS-ACS) simply proceeds with the authentication request 14a without first verifying participation. If the authentication password 16a provided by the cardholder to the ACS (or DS-ACS) fails, the reason may be either (1) the cardholder is not the true owner of the card, or (2) the cardholder does not participate in the 3-D Secure protocol. Either way, the merchant is ultimately correctly informed, and the need to verify participation is eliminated. FIG. 9B illustrates the exchanges involved in the foregoing implementations (notice the missing 11x exchanges present in FIG. 7 and FIG. 9A). These implementations may significantly speed up the cardholder authentication process if the cardholder is participating because of the recognition that cardholder authentication cannot be successful without the cardholder having enrolled (e.g., participation) in the authentication service. Therefore, the need for a separate participation verification exchange between parties is obviated because participation can be checked automatically without a specific request, or participation can be completely eliminated since a successful authentication by the ACS (or DS-ACS) automatically implies cardholder participation.

Another exemplary implementation also reduces participation requests by employing local caching techniques. For example and without limitation, in 3-D Secure, the merchant may store a local copy of participating issuing banks or cardholders (or both) that is periodically updated. Those skilled in the art will recognize that there are a variety of ways to provide the merchant with an updated copy of the participants. For example, the ACS, DS, both the ACS and DS, or DS-ACS may provide a location (for example and without limitation, a URL) where merchants can access an updated list of participants. Alternatively, these servers may periodically issue a broadcast message containing an updated list of participants to all merchants. In another implementation, specific merchants may transmit requests to the servers for updated lists when needed. In other implementations, the changes or updates (as opposed to the entire updated list) is communicated to the merchant.

Incorporation of Merchant Appliance in 3PAM Implementations

Specific implementations of 3PAM, such as Visa's 3-D Secure, require the merchant to install a software plug-in into the merchant's Web commerce server. Ideally, such plug-ins should work seamlessly with the merchant's current commerce server. However, such software installation can be unpredictable, possibly causing difficult integration issues and discouraging merchants from participating in the authentication protocol. As such, we disclose a filtering device known as a Merchant Appliance ("MA") that sits between the merchant's Web commerce server and the merchant's Internet connection and serves as a proxy.

In one exemplary embodiment, the MA forwards any exchanges between the cardholder and the merchant in an unmodified form until the cardholder transmits payment information to the merchant's commerce server. For example and without limitation, if the online purchase transaction occurs on the Web using the HTTP (or HTTPS) protocol, the transmission of such payment information occurs in the form of an HTTP POST request by the cardholder's Web browser to a URL at the merchant's Web commerce server. The URL may, without limitation, refer to a specific executable file located in the merchant's Web commerce server. Such a file may be, for example and without limitation, a Common Gateway Interface ("CGI") program (created either with programming languages including C, C++, Java, etc. or scripting languages such as Perl, TCL, shell languages, etc.) or an Application Server Pages ("ASP") file. Upon intercepting the HTTP POST request, the MA parses the URL and recognizes the request as a transmission of payment information (for example and without limitation, by identifying the name of the specific executable file in the URL). Upon this recognition, the MA ceases to forward transmissions to the merchant's Web commerce server and initiates a 3PAM authentication scheme. Once the cardholder is authenticated, the MA resumes the forwarding of transmissions to the merchant's Web commerce server. From the perspective of the merchant's Web commerce server, a conventional online purchase transaction has occurred. That is, the merchant's Web commerce server does not know or need to be modified to accommodate the 3PAM scheme.

Figure 10:
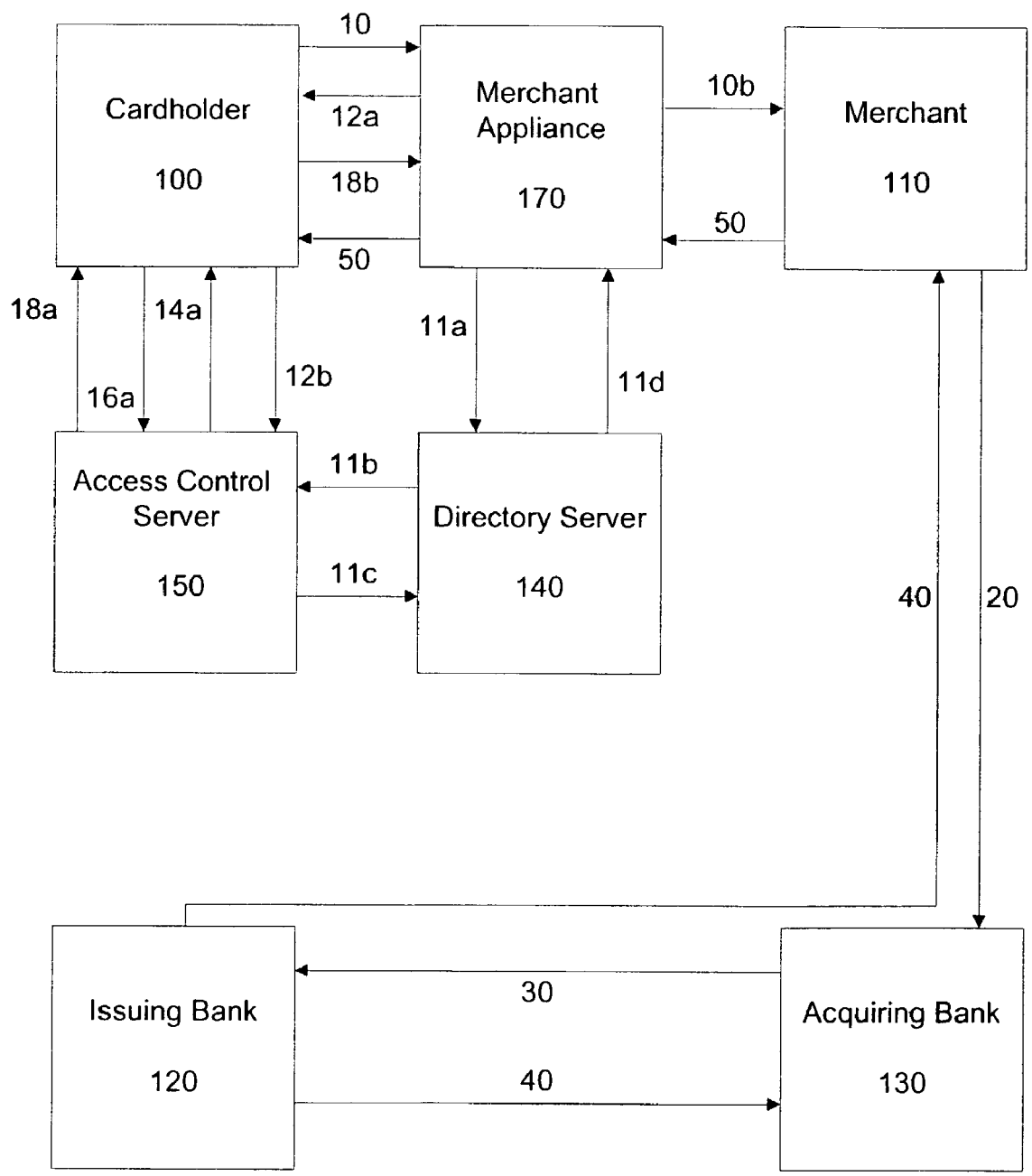
FIG. 10 illustrates an exemplary embodiment of the 3-D Secure protocol enhanced by a merchant appliance.

FIG. 10 illustrates an exemplary embodiment utilizing an MA within 3-D Secure. Unlike FIG. 7, where the merchant's Web commerce server contained plug-in software 112, there is no such software in FIG. 10. When the cardholder 100 attempts to securely transmit her payment information 10 to the merchant, either manually or through a GA, the MA 170 identifies the transmission 10 as one with payment information and "traps" it, preventing it from being forwarded to the merchant 110. The MA 170 then transmits a request 11a to the DS 140 to determine whether the cardholder participates in the 3-D Secure protocol. If the DS checks its local memory and finds a participating card range that includes the cardholder's card, the DS 140 then transmits a request 11b to the ACS 150 to determine whether the individual cardholder participates in the 3-D Secure protocol (e.g., cardholder has enrolled in the "Verified by Visa" program). If there is no appropriate card range or the individual cardholder does not participate in 3-D Secure, the DS informs the MA and the MA software forwards the initial transmission of payment information to the merchant's Web commerce server which then processes the transaction without any cardholder authentication. However, if the ACS 150 sends a confirmation 11c to the DS that the individual cardholder participates in 3-D Secure, the DS 140 returns a URL 11d of the ACS 150 to the MA 170. In turn, the MA 170 forwards a message 12a including a PAReq to the cardholder's Web browser 100, further instructing the cardholder's Web browser 100 to transmit the PAReq 12b to the URL of the ACS 150. Included in this message may be, for example and without limitation, JavaScript, or any other type of programming language which enables executable content to be distributed over the Internet, directing the cardholder's Web browser 100 to transfer the PAReq 12b to the ACS 150. Upon reception of the PAReq 12b, the ACS transmits a request 14a to the cardholder's Web browser 100 for an authentication password and thereafter, the cardholder 100 supplies the ACS 150 with such an authentication password 16a. If the ACS 150 verifies the cardholder's authentication password, it generates a message 18a including a PARes and forwards the message to the cardholder's Web browser 100, instructing the cardholder's Web browser 100 to transmit the PARes 18b to the merchant 110, which is then intercepted by the MA 170. Included in the PARes is an indication whether the transaction has been verified by the ACS. When the MA 170 intercepts the PARes including the verification by the ACS, it then forwards the initial payment information (now labeled 10b) to the merchant's Web commerce server 110 which then treats the transaction like a conventional online purchase, as illustrated in FIG. 1, relaying pertinent information 20 to the acquiring bank 130 and ultimately to the issuing bank 120 to authorize the purchase as in a conventional online purchase transaction. If the merchant 110 receives an authorization code 40, it may then inform the cardholder 100, through a secure Internet connection, that the transaction was successful 50.

Alternatively, in the SPA scheme, an MA may also be situated between the cardholder and the merchant. For example and without limitation, such an MA may be used to initiate a cardholder authentication process with the SPA wallet server at the issuing bank. Upon such authentication, the MA may send an appropriate pay Web page to the merchant.

While the foregoing embodiments describe the MA as a device situated between the merchant's Web commerce server and the merchant's Internet connection, those skilled in the art will recognize that the MA may be situated anywhere between the communication channel of the cardholder and the merchant. Furthermore, MAs may be deployed whenever a discrete functionality, protocol, or scheme (for example and without limitation, cardholder authentication) is to be incorporated into a pre-existing scheme or protocol (for example and without limitation, purchase transactions) in order to minimize integration difficulties with pre-existing software or hardware. As such, while the MAs have been disclosed in the context of an exemplary first transaction (in the form of a payment (or purchase) transaction) involving an exemplary second transaction (in the form of cardholder authentication), those skilled in the art will recognize that MAs may be used in a variety of other transactions and protocols. Those skilled in the art will readily appreciate that the MA can be implemented purely in hardware, or as a combination of hardware and software (e.g., a general purpose processor having software instructions); in either case, one may think of the MA as simply the appropriate processor coupled with the appropriate instructions for performing the aforementioned processes. The MA would typically be connected to (e.g., interposed within) the existing system via appropriate I/O interface(s) (e.g., perhaps as simple as RS-232, ethernet, or other interfaces in the case of a PC-implemented MA).

Card Constraints and Limitations

In addition to the foregoing embodiments, we also disclose the capability to impose additional constraints on cards other than conventional constraints such as an overall credit limit or an expiration date. Such constraints may include, for example and without limitation, (1) self-imposed daily purchase limits by a spendthrift, (2) parental constraints on the ability to purchase certain products (such as tobacco, alcohol, pornography, etc.) with a teenager's card, (3) limitations on categories of purchases such as food, clothes, books, cosmetics, etc., (4) limitations on purchases during certain time periods, or (5) limitations on purchases with different merchants. Such constraints may be considered "categorical" constraints in that they are linked to specific categories (days of use, product types, merchants, etc.) as opposed to merely an aggregate-dollars-per-payment-cycle constraint as with currently available cards. Those skilled in the art will recognize that the capability to impose such limitations on cards can be granted to the cardholder, merchant, issuing bank, corporation (with regard, for example, to a corporate card), or any other party (such as parents) or combination of such parties. The following examples, however, will describe the embodiments in the context of a cardholder imposing such constraints or limitations.

Applying for Cards with Constraints

In one exemplary embodiment, upon applying for a card with a card company (or issuing bank), a cardholder may receive a form from the card company requesting enrollment information. In a conventional application form, requested information typically includes the cardholder's name, address, birth date, social security number, employment information, and financial information. An application form of the exemplary embodiment may include further options enabling the cardholder to specify constraints to be imposed on the card. For example and without limitation, the application form may provide the cardholder with a menu of constraints to select from. Such application forms may be filled out and sent through the conventional mail system, may be filled out in an online form and sent to the card company through a secure network channel, or may be filled out and transmitted in any other secure method known to those skilled in the art.

Enforcing Constraints in Conventional Transactions

Upon receiving and processing the application form, the card company (or issuing bank) can store the cardholder's requested constraints in a variety of ways. In one exemplary embodiment, the constraints may be stored as records on the issued card itself. For example and without limitation, such constraints may be stored, possibly in encrypted form, on the magnetic stripe of a card or in the computer chip of a smart card. As such, in a conventional purchase transaction, upon reading the information (including the constraints) off the magnetic stripe or smart card, a merchant's card processing system may send such information to an issuing bank (or possibly an ACS), which determines whether the transaction can be authorized under the constraints of the card. Alternatively, other embodiments may enable the merchant's processing system to analyze certain constraints and make a local decision regarding the acceptability of the transaction without consulting the issuing bank. In other embodiments, such constraints could also be stored in a database,[8] either alternatively or in addition to the constraints being stored on the card itself. Access to the database could be granted to the cardholder, merchant, issuing bank, ACS, corporation (with regard, for example, to a corporate card), or any other party or combination of such parties needing access. If, for example, the constraints are stored in a database rather than the card itself, then the merchant's card processing system may send the information gathered from the card and send it to the party (for example, issuing bank or ACS) performing the authorization. That party will access the database using identifying information from the information received from the merchant's processing system in order to find the constraints associated with the card. Upon matching the constraints to the card, the authorizing party will then be able to perform the authorization. If, alternatively, the constraints (or certain subsets thereof) are stored in both a database and on the card, then the merchant may make local decisions regarding certain constraints before consulting the authorizing party to process other constraints, if necessary.

[8] In general then, the constraints can be stored in any of the foregoing storage mechanisms (e.g., magnetic stripe, computer chip, database), and still other forms of memory known to those skilled in the art.

Online Dynamic Modification of Constraints

Card constraints can be enforced within certain conventional card transactions (where the customer physically presents the card to the merchant). However, it is difficult to add, delete, or edit constraints in this conventional setting. We disclose that the modification of card constraints can be performed, possibly in real-time, in an online setting. For example and without limitation, a cardholder owning a card with constraints may log-on to the Web site of the issuing bank to add, delete, or edit constraints imposed on the card. Once the cardholder submits such modifications, the issuing bank may transmit a message to the database that stores the constraints requesting that the modifications be made to the cardholder's constraints. Alternatively, the cardholder may access the database directly (for example and without limitation, through a Web site) in order to change the constraints imposed on the card. As detailed later, constraints may also be stored in a GA. In such an embodiment, the cardholder may visit the Web site of the GA in order to modify the constraints. In another embodiment, a cardholder may send an email message to the issuing bank, GA, ACS, or database requesting that such modifications be made.

Online Enforcement of Constraints

One exemplary embodiment, utilizing card constraints, in a conventional online card transaction without cardholder authentication can be illustrated with FIG. 1. As previously discussed, under the authorization phase of a conventional online card transaction, the cardholder 100 transmits her payment information 10 to the merchant 110. Upon reception of the cardholder's payment information, the merchant 110 establishes a secure Internet connection with the acquiring bank and relays the pertinent information 20 from the cardholder's payment information to the acquiring bank 130. The acquiring bank 130 then transmits this information 30 to the issuing bank 120. Once the issuing bank receives this information, its checks the information to see if the transaction is legitimate and can be verified. In particular, the issuing bank, using identifying information (such as the credit card number) that it received from the acquiring bank, may access a database that stores the constraints related to the cardholder's card. In order to authorize the transaction, the issuing bank determines if the transaction may be performed within the constraints related to the card. If the issuing bank 120 does verify the transaction, it sends an authorization code 40 through the secure proprietary network to both the merchant 110 and the acquiring bank 130. If the merchant 110 does receive an authorization code, it may inform the cardholder 100, through a secure Internet connection, that the transaction was successful 50.

Alternatively, if a cardholder authentication scheme such as 3PAM or 4PAM is incorporated into the online purchase transaction, the checking of constraints can be shifted out of the conventional authorization stage, as was discussed above, and into the cardholder authentication stage. As illustrated in FIG. 3, if the checking of constraints is incorporated in 3PAM, then in one embodiment, prior to the transmission of the authentication password request 14 by the issuing bank 120 to cardholder 100, the issuing bank may check the constraints on a card by accessing a database. If the transaction can be performed under the constraints of the card, then the issuing bank 120 continues through FIG. 3 by transmitting the request 14 for an authentication password to authenticate the cardholder. Those skilled in the art will recognize that there may be variations on when the checking of constraints occurs in relation to the cardholder authentication stage. For example and without limitation, the checking of constraints in another embodiment may occur after the cardholder's authentication password is received and verified by the issuing bank rather than before.

In another exemplary embodiment, card constraints may be stored in a GA. As illustrated in FIG. 5 and without limitation, when a GA is used in a 3PAM, the GA 105A transmits a request 2 for an authentication password from the cardholder 100. In response, the cardholder 100 supplies the authentication password 4 to the GA 105A. If the authentication password is correct, the cardholder is able to access payment information for various cards (or only one card) that she may have previously registered with the GA. Such payment information may also include information regarding the constraints which have been placed on the card. When the cardholder selects a particular set of payment information related to a specific card to use in the purchase transaction, the GA 105A either transmits this payment information (now including constraints) 10a to the merchant 110 and/or automatically fills in the checkout Web page with the payment information such that the cardholder can select a "confirm" or "buy" button on the Web page to validate or send the information 10 herself. Either way, once the merchant 110 receives the payment information (now including constraints), it can either (1) check the constraints on its own to determine the validity of the transaction, or (2) forward the pertinent information 20 (including the constraints) to the acquiring bank 130 and ultimately to the issuing bank 120 which will check the constraints and verify the purchase.

Integration of Multiple Embodiments and Implementations

Figure 11:
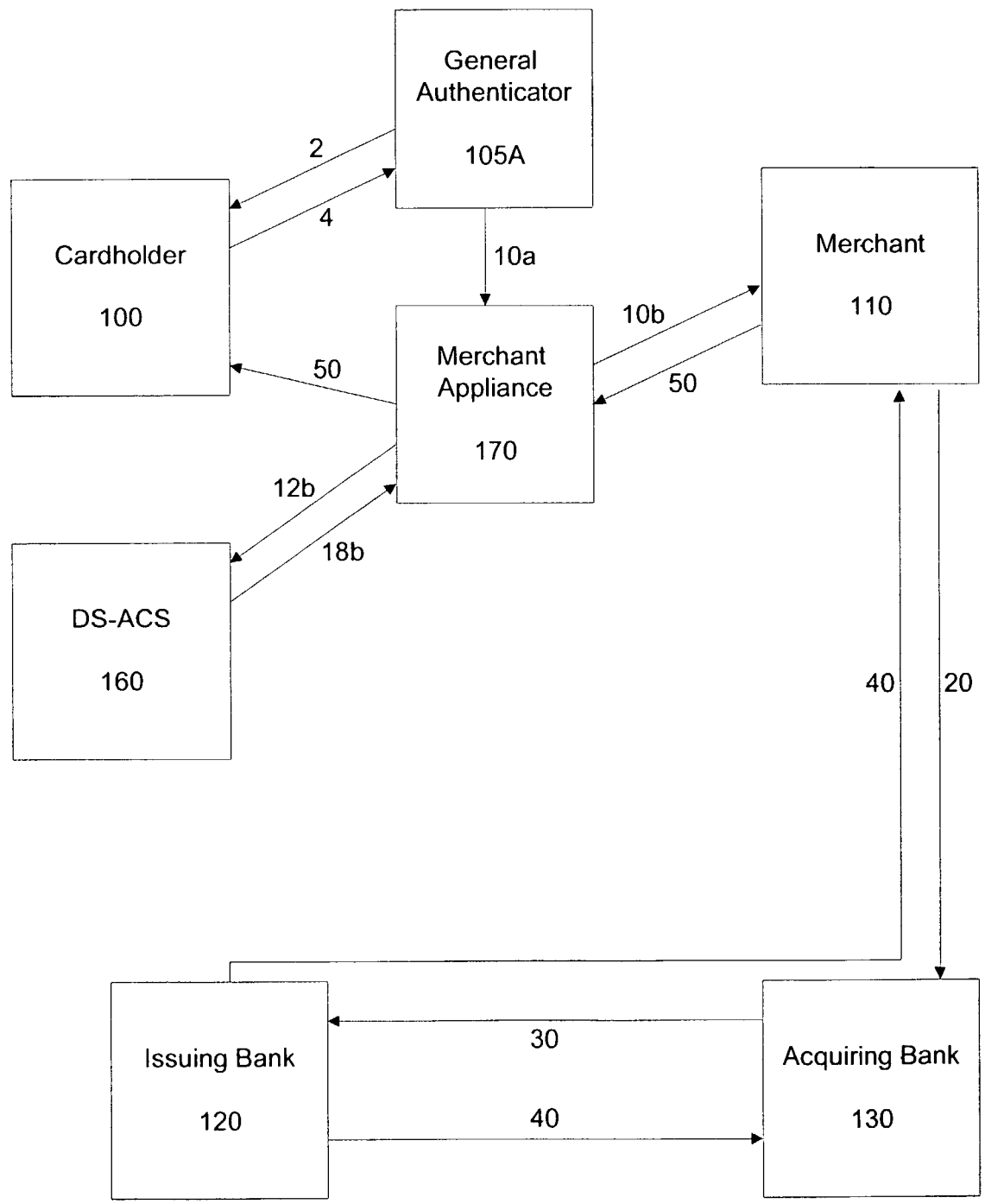
FIG. 11 illustrates an exemplary embodiment including 4PAM, integration of servers and elimination of dispensable messages, MAs, and card constraints.

Those skilled in the art will recognize that several of the disclosures of the exemplary embodiments, for example and without limitation: 4PAM, skeleton messages, elimination of dispensable messages, MAs, and card constraints may be combined in any variety of subsets to create an enhanced cardholder authentication system. FIG. 11 illustrates one example where multiple embodiments and implementations are integrated into a single scheme. Those skilled in the art will recognize that FIG. 11 is only one way of integrating the above mentioned embodiments and implementations into a single scheme and that other ways may integrate these and other aspects of the present invention differently.

FIG. 11 is one example incorporating 4PAM, elimination of dispensable messages, MAs, and card constraints into 3-D Secure. When the cardholder enters the merchant's checkout process, the GA may be invoked to assist the cardholder in the purchase transaction. The GA 105A transmits a request 2 through a secure Internet connection for an authentication password from the cardholder 100. In response, the cardholder 100 supplies the access password 4 to the GA 105A. If the access password fails, the GA will not allow the cardholder to access payment information stored in it. If the access password is correct, the cardholder is able to access payment information for various cards (or only one card) that she may have previously registered with the GA. Such payment information for each card may possibly include a cardholder authentication password related to the card as well as constraints imposed on the card. When the cardholder selects a particular set of payment information related to a specific card to use in the purchase transaction, the GA 105A either transmits this payment information 10*a*, possibly through a secure Internet connection, to the merchant 110 (or, alternatively, automatically fills in the checkout Web page with the payment information such that the cardholder can select a "buy" or "purchase" button on the Web page to validate or send the information 10 herself, as illustrated in FIG. 6). Either way, the MA 170 intercepts the transmission 10*a*, identifies it as one with payment information and "traps" it, preventing it from being forwarded to the merchant 110. The MA inspects the constraints contained in the payment information to determine if the transaction can be performed under such constraints. If not, the MA transmits a message to the cardholder's Web browser 100 indicating the failure of the transaction due to the constraints. However, if the transaction can go forth under the imposed constraints, the MA 170 then generates a PAReq which may include the cardholder authentication password. The MA transmits the PAReq 12*b* (or a message including a PAReq and a cardholder authentication password) to the DS-ACS 160. The DS-ACS then determines whether the cardholder's authentication password is valid. If the cardholder authentication password fails, either (1) the cardholder is not the true owner of the card, or (2) the cardholder does not participate in the 3-D Secure protocol (obviating a separate process to verify participation or enrollment in 3-D Secure). However, if the DS-ACS 160 does verify the cardholder's authentication password, it generates a PARes 18*b* and transmits it to the merchant 110. Included in the PARes is an indication whether the transaction has been verified by the DS-ACS. However, the MA 170 intercepts the PARes 18*b* sent directly to the merchant 110. When the MA 170 intercepts the PARes including the verification by the DS-ACS, it then forwards the initial payment information (now labeled 10*b*) to the merchant's Web commerce server 110 which then treats the transaction like a conventional online purchase, relaying pertinent information 20 to the acquiring bank 130 and ultimately to the issuing bank 120 to authorize the purchase as in a conventional online purchase transaction. If the merchant 110 receives an authorization code 40, it may then inform the cardholder 100, through a secure Internet connection, that the transaction was successful 50.

The various embodiments described above should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims that follow.

What is claimed is:

1. A method for conducting a payment card transaction comprising, at an intermediary having an identity distinct from a cardholder and a merchant system, comprising:
    (a) receiving and storing in the intermediary:
        (i) an authentication password of the cardholder; and
        (ii) contact information for an issuing bank system of the payment card;
    (b) receiving an access password from the cardholder to unlock the payment information; wherein the intermediary authenticates the user and generates authentication information using at least the authentication password;
    (c) providing at least a portion of the payment information for use by the merchant system; and
    (d) providing the authentication information to the issuing bank system to authenticate the cardholder to the issuing bank system.

2. The method of claim 1 where the intermediary is a software program in a computer memory.

3. The method of claim 2 where:
    (i) the intermediary is a wallet; and
    (ii) the contact information is a network address.

4. The method of claim 1 where the access password is retrieved from a cookie storing the access password from a previous transaction.

5. The method of claim 1 implemented as part of a backwards-compatible transaction processing system configured to either:
    (x) implement the method of claim 1; or
    (y) obtain the authentication password directly from the cardholder without assistance of the intermediary.

6. The method of claim 5 wherein (y) is contingent upon determining that cardholder is not associated with the intermediary.

7. The method of claim 1 wherein (b) is performed after the cardholder computer has transmitted payment information to the merchant system.

8. The method of claim 1 where the intermediary contains a plurality of authentication passwords for a plurality of payment cards.

9. The method of claim 1 implemented in a manner that eliminates at least one dispensable message among the communication-related steps of the method.

10. A method for conducting a payment card transaction comprising:
    (a) receiving a request from a merchant computer to authorize a transaction involving a cardholder computer;
    (b) requesting an authentication password from the cardholder;
    (c) receiving the authentication password via an intermediary having an identity distinct from the cardholder and the merchant computer, the intermediary:
        (i) having stored therein the cardholder's authentication password;
        (ii) having stored therein contact information for an issuing bank computer; and
        (iii) having been accessed by the cardholder providing an access password;
    (d) the intermediary authenticating the cardholder, wherein the intermediary generates authentication information from the authentication password;
    (e) the intermediary validating the transaction for the merchant computer; and
    (f) the intermediary transmitting the authentication information and the contact information to the issuing bank computer.

11. The method of claim 10 where the intermediary is a software program in a memory of at least one of the computers.

12. The method of claim 11 where:
    (i) the intermediary is a wallet; and
    (ii) the contact information is a network address.

13. The method of claim 10 where the access password is retrieved from a cookie storing the access password from a previous transaction.

14. The method of claim 10 implemented as part of a backwards-compatible transaction processing system configured to be operable, in the alternative, to obtain the authentication password directly from the cardholder without assistance of the intermediary.

15. The method of claim 10 where the alternative is contingent upon determining that cardholder is not associated with the intermediary.

16. The method of claim 10 where the (b) is performed after the cardholder computer has transmitted payment information to the merchant computer.

17. The method of claim 10 where the intermediary contains a plurality of authentication passwords for a plurality of payment cards.

18. The method of claim 10 where the (d) and (e) are performed, at least in part, within a processing module:
    (x) interposable within an existing transaction processing system between the issuing bank computer and the cardholder; and
    (y) which intercepts, and sends to off-line processing, a communication involving the merchant computer which the existing transaction system is not configured to process in the absence of the module.

19. The method of claim 10 where the validating includes checking a categorical credit card constraint pertaining to the cardholder.

20. The method of claim 10 where:
    (x) the (d) includes receiving a message proxy reduced in size from what would otherwise comprise a larger message; and
    (y) obtaining information needed for the authentication using an alternate communication mechanism, distinct from an existing communication link with the cardholder, as directed by the message proxy.

21. An apparatus for conducting a payment card transaction comprising, at an intermediary having an identity distinct from the cardholder and a merchant system, comprising:
    (a) means for receiving and storing in the intermediary:
        (i) an authentication password of the cardholder; and
        (ii) contact information for an issuing bank system of the payment card;
    (b) means for receiving an access password from a computer of the cardholder to unlock the payment information;
    (c) means for providing at least a portion of the payment information for use by the merchant system;
    (d) means for authenticating the cardholder by the intermediary, wherein the intermediary includes means for generating authentication information and means for providing the authentication information to the issuing bank system on behalf of the cardholder.

22. The apparatus of claim 21, wherein the intermediary comprises a general authenticator configured to participate in a 4PAM authentication scheme where the general authenticator communicates the authentication information to the issuing bank system.

23. The apparatus of claim 21, where the other payment information comprises purchase information transmitted from the intermediary to the merchant system.

24. The apparatus of claim 21, wherein the intermediary is configured to eliminate request and response exchanges between the merchant system and the issuing bank system using the authentication information.

25. A computer-readable medium containing logic instructions for conducting a payment card transaction comprising, at an intermediary having an identity distinct from the cardholder and a merchant system, comprising login instructions that when executed:
    (a) receive and store in the intermediary:
        (i) an authentication password of the cardholder; and
        (ii) contact information for an issuing bank system of the payment card;
    (b) receive an access password from a computer of the cardholder to unlock the payment information;
    (c) provide at least a portion of the payment information for use of the merchant system; and
    (d) authenticate the cardholder by the intermediary, wherein the intermediary includes code that generates authentication information using at least the access password, and wherein the authentication information authenticates the card holder to the issuing bank system.

26. The computer-readable medium of claim 25, wherein the login instructions comprise code that generates a skeleton message to communicate portions of the payment card transaction to the merchant system.

27. The computer-readable medium of claim 26, wherein the skeleton message is configured to reduce communication channel congestion by sending the merchant system a minimal set of information pertaining to the payment card transaction, and wherein the skeleton message is sufficient in information content to enable the merchant system to process the payment card transaction once the payment card transaction is authenticated.

28. A self-contained apparatus for offering updated functionality to an existing system for conducting a first transaction between a first party and a second party, comprising:
    (a) an I/O interface for connecting with the existing system;
    (b) a processing subsystem:
        (i) interposable within the existing system via the I/O interface; and
        (ii) containing a processor and logic instructions therefor which when executed:
            (A) monitors a plurality of communications between the parties;
            (B) intercepts a communication which the system is not configured to process in the absence of the apparatus;
            (C) establishes a communication path with a third party, by using information within the communication;
            (D) conducts a second transaction with the third party over the established communication path;
            (E) returns a result thereof to at least one of the parties to the transaction; and
            (F) generates authentication information using data supplied by the first party, and provides the authentication information to the third party for authentication of the first party.

29. The apparatus of claim 28 further configured to pass through a communication that is processable by the existing system without the aid of the apparatus.

30. The apparatus of claim 28 where:
    (i) the first transaction is a payment transaction;
    (ii) the first party is a cardholder and the second party is a merchant;
    (iii) the second transaction includes authentication of the cardholder; and (iv) the information within the communication pertains to an issuer of the payment card.

31. The apparatus of claim 28 where at least one of the parties is eligible to participate in an authentication scheme involving the third party, and the second transaction is contingent upon confirming the participation.

32. The apparatus of claim 31 where the authentication scheme is offered by a credit card issuer.

33. A self-contained apparatus for offering updated functionality to an existing system for conducting a first transaction between a first party and a second party, while maintaining backwards compatibility, comprising:
 (a) means for interfacing with the existing system without necessarily requiring any modification to the existing system; and
 (b) means for monitoring a plurality of communications between the parties;
 (c) means for intercepting a communication which the system is not configured to process in the absence of the apparatus:
 (d) means for establishing a communication path with a third party, by using information within the communication;
 (e) means for conducting a second transaction with the third party over the established communication path;
 (f) means for returning a result thereof to at least one of the parties to the transaction; and
 (g) means for generating an authentication message from the self-contained apparatus used to represent an authenticated first party to the third party.

34. A computer-readable medium for implementing a computer-operated module for offering updated functionality to an existing system for conducting a first transaction between a first party and a second party, while maintaining backwards compatibility, comprising computer-executable logic instructions that when executed:
 (a) monitor a plurality of communications between the parties;
 (b) intercept a communication which the system is not configured to process in the absence of the apparatus:
 (c) establish a communication path with a third party, by using information within the communication;
 (d) conduct a second transaction with the third party over the established communication path;
 (e) return a result thereof to at least one of the parties to the transaction; and
 (f) generate authentication information pertaining to the first party, wherein the authentication information verifies the authenticity of the first party to the third party without the intervention of the first party.

35. A method for implementing a cardholder authentication scheme, usable in connection with an online purchase transaction, comprising:
 (a) initializing a computer-readable wallet with a cardholder's payment information suitable for use in an on-line transaction involving a three party cardholder authentication scheme:
  (i) including at least the cardholder, a merchant system, and an issuing bank system;
  (ii) the cardholder having an authentication password for authentication at the issuing bank system prior to the issuing bank system authorizing the transaction to the merchant system;
 (b) eliminating the need for the cardholder to transmit the payment information directly to a merchant system by invoking the wallet to assist the cardholder in a purchase transaction;
 (c) at the wallet, transmitting a request for an access password from the cardholder;
 (d) receiving the access password from the cardholder;
 (e) verifying the access password, and allowing the cardholder to access the payment information
 (f) generating authentication information from the authentication password stored in the wallet, the authentication information being intended to validate the cardholder to the issuing bank system.

36. The method of claim 35 where the payment information includes the authentication password.

37. The method of claim 35 where the (f) includes filling in a purchase page of the merchant system with the payment information.

38. The method of claim 37 further comprising receiving a validation of the payment information from the cardholder.

39. The method of claim 37 further enabling the cardholder to transmit the payment information to the merchant system.

40. The method of claim 35 where the wallet and the a purchase page of the merchant are hyperlinked to facilitate transmission of the payment information.

41. In a transaction processing method involving a three party cardholder authentication scheme (i) including at least the cardholder, a merchant system, and an issuing bank system, with (ii) the cardholder having an authentication password for authentication at the issuing bank system prior to the issuing bank authorizing the transaction to the merchant system, the improvement comprising:
 offering the cardholder an option to either:
  (i) participate in a conventional 3PAM authentication scheme; or
  (ii) participate in a 4PAM authentication scheme incorporating a computer-readable wallet for presentation of payment information, wherein once the wallet authenticates the cardholder, the wallet generates authentication information on behalf of the cardholder to the issuing bank system without further intervention by the cardholder.

42. The method of claim 41 further comprising, upon the cardholder's selection of the (i), soliciting the authentication password from the cardholder.

43. The method of claim 41 further comprising, upon the cardholder's selection of the (ii), soliciting from the cardholder a wallet access password to obtain therefrom the authentication password.

44. The method of claim 43 where the authentication password and the access password are the same.

* * * * *